United States Patent
Camplejohn et al.

(10) Patent No.: US 9,507,856 B1
(45) Date of Patent: Nov. 29, 2016

(54) SYSTEM AND METHOD FOR DISCOVERING SUBSCRIBER CONTENT AFFINITY AND MAKING CORRESPONDING RECOMMENDATIONS

(75) Inventors: Doug Camplejohn, San Francisco, CA (US); Dan Chiao, South San Francisco, CA (US)

(73) Assignee: D&B BUSINESS INFORMATION SOLUTIONS (IE)

( * ) Notice: Subject to any disclaimer, the term of this patent is extended or adjusted under 35 U.S.C. 154(b) by 272 days.

(21) Appl. No.: 12/653,017

(22) Filed: Dec. 7, 2009

(51) Int. Cl.
 G06F 7/00 (2006.01)
 G06F 17/30 (2006.01)

(52) U.S. Cl.
 CPC ......... *G06F 17/30702* (2013.01); *G06F 17/30* (2013.01)

(58) Field of Classification Search
 CPC .............................. G06F 17/00; G06F 17/30
 See application file for complete search history.

(56) References Cited

U.S. PATENT DOCUMENTS

| | | | |
|---|---|---|---|
| 2002/0108115 A1* | 8/2002 | Palmer | 725/50 |
| 2006/0155698 A1 | 7/2006 | Vayssiere | |
| 2007/0038712 A1* | 2/2007 | Affronti et al. | 709/206 |
| 2007/0100836 A1 | 5/2007 | Eichstaedt et al. | |
| 2007/0100959 A1 | 5/2007 | Eichstaedt et al. | |
| 2007/0100960 A1 | 5/2007 | Eichstaedt et al. | |
| 2008/0306972 A1* | 12/2008 | Wilkin et al. | 707/100 |
| 2009/0089714 A1* | 4/2009 | Blake et al. | 715/850 |
| 2010/0030792 A1* | 2/2010 | Swinton et al. | 707/100 |
| 2010/0205169 A1* | 8/2010 | Narayan et al. | 707/711 |
| 2011/0066613 A1* | 3/2011 | Berkman et al. | 707/734 |
| 2011/0071898 A1* | 3/2011 | Feng et al. | 705/14.43 |

\* cited by examiner

*Primary Examiner* — Thu Nga Nguyen
(74) *Attorney, Agent, or Firm* — Ohlandt, Greeley, Ruggiero & Perle, L.L.P.

(57) ABSTRACT

A system and method to discover subscriber content affinity and make corresponding recommendations is disclosed. A particular embodiment includes collecting digital content from a plurality of content feeds; receiving a subscriber-provided affinity indicator from a subscriber; filtering the digital content based on the subscriber-provided affinity indicator to produce filtered content; tracking interactions with the filtered content by the subscriber; and automatically determining implicit subscriber affinity based on subscriber interactions with the filtered content.

12 Claims, 20 Drawing Sheets

SYSTEM AND METHOD FOR DISCOVERING SUBSCRIBER CONTENT AFFINITY AND MAKING CORRESPONDING RECOMMENDATIONS

TECHNICAL FIELD

This application relates to a method and system for use with networked content sources, according to one embodiment, and more specifically, for enabling networked computer users to discover subscriber content affinity and make corresponding recommendations.

BACKGROUND

The content available to networked computer users has increased significantly in recent years. Providers of such content include blogs, news sources, sports sources, weather sources, libraries, friends, universities, businesses, and the like. Many of these content providers provide new or changed content almost regularly.

Because of the large amount of changing content, users often seek mechanisms that help them manage access and use of the content sources that interest them. One such mechanism uses a Really Simple Syndication (RSS) feed. Generally, RSS provides web content or summaries of web content together with links to the full versions of the content, and other meta-data. This information is delivered as an Extensible Markup Language (XML) file typically called an RSS feed, web feed, RSS stream, or RSS channel. RSS feeds enable a user to subscribe to a content provider's website, or the like, and receive a content feed in a defined format. Other services can provide an alert indicating when a change to the content has occurred. However, as the number of RSS feeds available over a network increases, a subscriber may become increasingly overwhelmed. Also, managing large numbers of RSS feeds for potentially millions of subscribers has become a particularly cumbersome and difficult challenge.

Thus, a system and method enabling networked computer users to discover subscriber content affinity and make corresponding recommendations is needed.

BRIEF DESCRIPTION OF THE DRAWINGS

The various embodiments is illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

Figure 1:
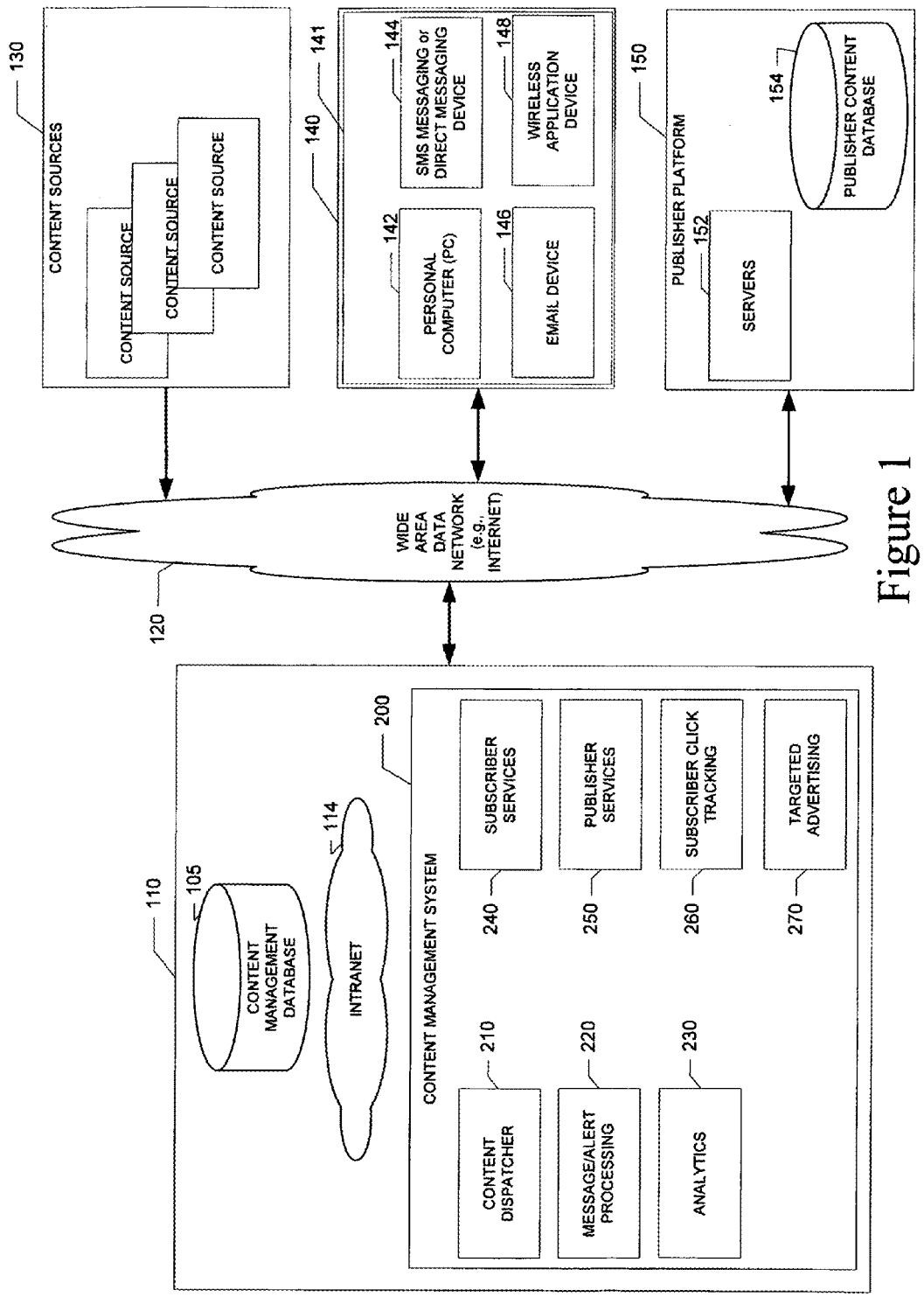
FIG. 1 illustrates an example embodiment of a system and method to discover subscriber content affinity and make corresponding recommendations.

Referring to FIG. 1, in an example embodiment, a system and method to discover subscriber content affinity and make corresponding recommendations is disclosed. In various example embodiments, an application or service, typically operating on a host site (e.g., a website) 110, is provided to simplify and facilitate content feed management for a user at a subscriber platform 140 from the host site 110. Multiple content sources 130 provide a plurality of content feeds to which a user may become a subscriber. One or more of the content feeds can be provided by one or more content publishers operating at publisher platforms 150. It will be apparent to those of ordinary skill in the art that content sources 130 can be any of a variety of networked content providers or aggregators as described in more detail below. The content management site 110, content sources 130, subscriber platforms 140, and publisher platforms 150 may communicate and transfer content and information via a wide area data network (e.g., the Internet) 120. Various components of the content management site 110 can also communicate internally via a conventional intranet or local area network (LAN) 114.

Networks 120 and 114 are configured to couple one computing device with another computing device. Networks 120 and 114 may be enabled to employ any form of computer readable media for communicating information from one electronic device to another. Network 120 can include the Internet in addition to LAN 114, wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those of ordinary skill in the art. Furthermore, remote computers and other related electronic devices can be remotely connected to either LANs or WANs via a modem and temporary telephone link.

Networks 120 and 114 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Networks 120 and 114 may also include an autonomous system of terminals, gateways, routers, and the like connected by wireless radio links or wireless transceivers. These connectors may be configured to move freely and randomly and organize themselves arbitrarily, such that the topology of networks 120 and 114 may change rapidly.

Networks 120 and 114 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, 4G, and future access networks may enable wide area coverage for mobile devices, such as one or more of client devices 141, with various degrees of mobility. For example, networks 120 and 114 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Networks 120 and 114 may also be constructed for use with various other wired and wireless communication protocols, including TCP/IP, UDP, SIP, SMS, RTP, WAP, CDMA, TDMA, EDGE, UMTS, GPRS, GSM, UWB, WiMax, IEEE 802.11x, and the like. In essence, networks 120 and 114 may include virtually any wired and/or wireless communication mechanisms by which information may travel between one computing device and another computing device, network, and the like. In one embodiment, network 114 may represent a LAN that is configured behind a firewall (not shown), within a business data center, for example.

The content sources 130 may include any of a variety of providers of network transportable digital content, some of which may be RSS feeds. As used herein, the term RSS refers to any of a family of file formats and associated mechanisms usable to enable a user to subscribe to and receive network syndicated content from a content provider over a network. Typically, the file format that is employed is XML, however, the various embodiments are not so limited, and other file formats may be used. For example, feed formats other than HTML/XML or formats other than open/standard feed formats can be supported by various embodiments. Any electronic file format, such as Portable Document Format (PDF), audio (e.g., Motion Picture Experts Group Audio Layer 3—MP3, and the like), video (e.g., MP4, and the like), and any proprietary interchange format defined by specific content sites can be supported by the various embodiments described herein. Syndicated content includes, but is not limited to such content as news feeds, events listings, news stories, blog content, headlines, project updates, excerpts from discussion forums, business or government information, and the like. The abbreviation RSS as used herein includes at least the following: Rich Site Summary, RDF Site Summary, and Really Simple Syndication. Furthermore, although RSS is described, the various embodiments are not limited to RSS. For example, Atom, a syndication specification adopted by the Internet Engineering Task Force (IETF) may also be employed. As used throughout this application, including the claims, RSS refers to RSS, Atom, and other syndication file formats derived therefrom. Moreover, as used herein, the terms "feed," and "RSS feed," sometimes called a channel, refers to any mechanism that enables content access and/or notification from a content source 130. Thus, as used herein, a feed mechanism may include a push mechanism, a pull mechanism, or a polling mechanism. In one embodiment, an RSS feed may represent a summary of content formatted in an RSS format and available for access. Moreover, a content source 130 may provide more than one feed.

In a particular embodiment, a subscriber platform 140 with one or more client devices 141 enables a user/subscriber to access content and/or alerts from the content sources 130 via the network 120. Client devices 141 may include virtually any computing device that is configured to send and receive information over a network, such as network 120. Such client devices 141 may include portable devices 144 or 146 such as, cellular telephones, smart phones, display pagers, radio frequency (RF) devices, infra-red (IR) devices, global positioning devices (GPS), Personal Digital Assistants (PDAs), handheld computers, wearable computers, tablet computers, integrated devices combining one or more of the preceding devices, and the like. Client devices 141 may also include other computing devices, such as personal computers 142, multiprocessor systems, microprocessor-based or programmable consumer electronics, network PC's, and the like. As such, client devices 141 may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message.

Client devices 141 may also include at least one client application that is configured to receive content or messages from another computing device via a network transmission. The client application may include a capability to provide and receive textual content, graphical content, video content, audio content, alerts, messages, notifications, and the like. Moreover, client devices 141 may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like.

Client devices 141 may also include a wireless application device 148 on which a client application is configured to enable a user of the device to subscribe to at least one RSS feed provided by a content source 130. Such subscription enables the user at subscriber platform 140 to receive through the client device 141 at least a portion of the content and/or an alert (or notification) that updated content is available for access by the user. In another embodiment, the alert may include some or all of the updated content. Such content may include, but is not limited to, stock feeds, news articles, personal advertisements, shopping list prices, images, search results, blogs, sports, weather reports, or the like. Moreover, the content and/or the alerts may be provided to client devices 141 using any of a variety of delivery mechanisms, including IM, SMS, Twitter, Facebook, MMS, IRC, EMS, audio messages, HTML, email, or another messaging application. In a particular embodiment, the application executable code used for content subscription as described herein can itself be downloaded to the wireless application device 148 via network 120.

In some cases, a user at subscriber platform 140 can subscribe to certain content and/or alerts to be provided by all mechanisms available on the client device(s) 141, and another alert for other registered content to be provided by a single delivery mechanism. Additionally, some content and/or alerts may be provided through an RSS delivery server with a push mechanism to provide a relatively immediate alert. In various embodiments described in more detail below, the host site 110 can employ stored subscriber profile information to deliver the alert and/or content to the user using a variety of delivery mechanisms. For example, alerts and/or content can be delivered to a user via email, Short Message Service (SMS), wireless applications, and direct messaging (e.g., Twitter) to name a few. Additionally, alerts and/or content can be provided to a user in response to a request from the user. For example, in a particular embodiment described in more detail below, users can configure their subscription for web-based alerts, wherein a user can log into a website provided by host 110 to view alerts that have been posted to their user accounts. The delivery of content and/or alerts can also be scheduled at predefined times to provide content and/or alerts according to a pre-configured schedule.

The publisher platform 150 represents a particular content provider, which may be any one of the content sources 130. One or more of the content feeds provided by one or more content sources 130 can operate at publisher platform 150. In a manner described in more detail below, publisher platform 150 can augment an item of content to provide functionality with which a user at subscriber platform 140 can automatically subscribe to the item of content with a single-click user action. This beneficial functionality simplifies the content subscription process. As with any of the content sources 130, publisher platform 150 can include a data storage device or database of publisher content 154 and one or more servers 152 to serve that content to users at subscriber platforms 140 via network 120.

Referring still to FIG. 1, host site 110 of an example embodiment is shown to include a content management system 200, intranet 114, and content management database 105. Content management system 200 includes content dispatcher 210, message/alert processing module 220, analytics module 230, subscriber services module 240, publisher services module 250, subscriber click tracking module 260, and targeted advertising module 270. Each of these modules can be implemented as software components executing within an executable environment of content management system 200 operating on host site 110. Each of these modules of an example embodiment is described in more detail below in connection with the figures provided herein.

U.S. Patent Application No. 2007/0100960 describes a system, apparatus, and method for managing an alert to a subscriber based on a change of content at an RSS content source (RCS). A content collector identifies changes in content from various RCS's. In one embodiment, the RCS may notify the content collector of a change in content. In another embodiment, a crawler is used to identify an RCS with changed content based, in part, on a subscriber's request. Information about the RCS with changed content is provided to at least one of a plurality of matching engines using a load-balancing mechanism. Each of the matching engines manages a store that identifies subscribers that have requested an alert from a particular RCS. The matching engines further determine when the subscriber was last notified of a change in content from that RCS so that the subscriber is not notified multiple times of the same change.

Figure 2:
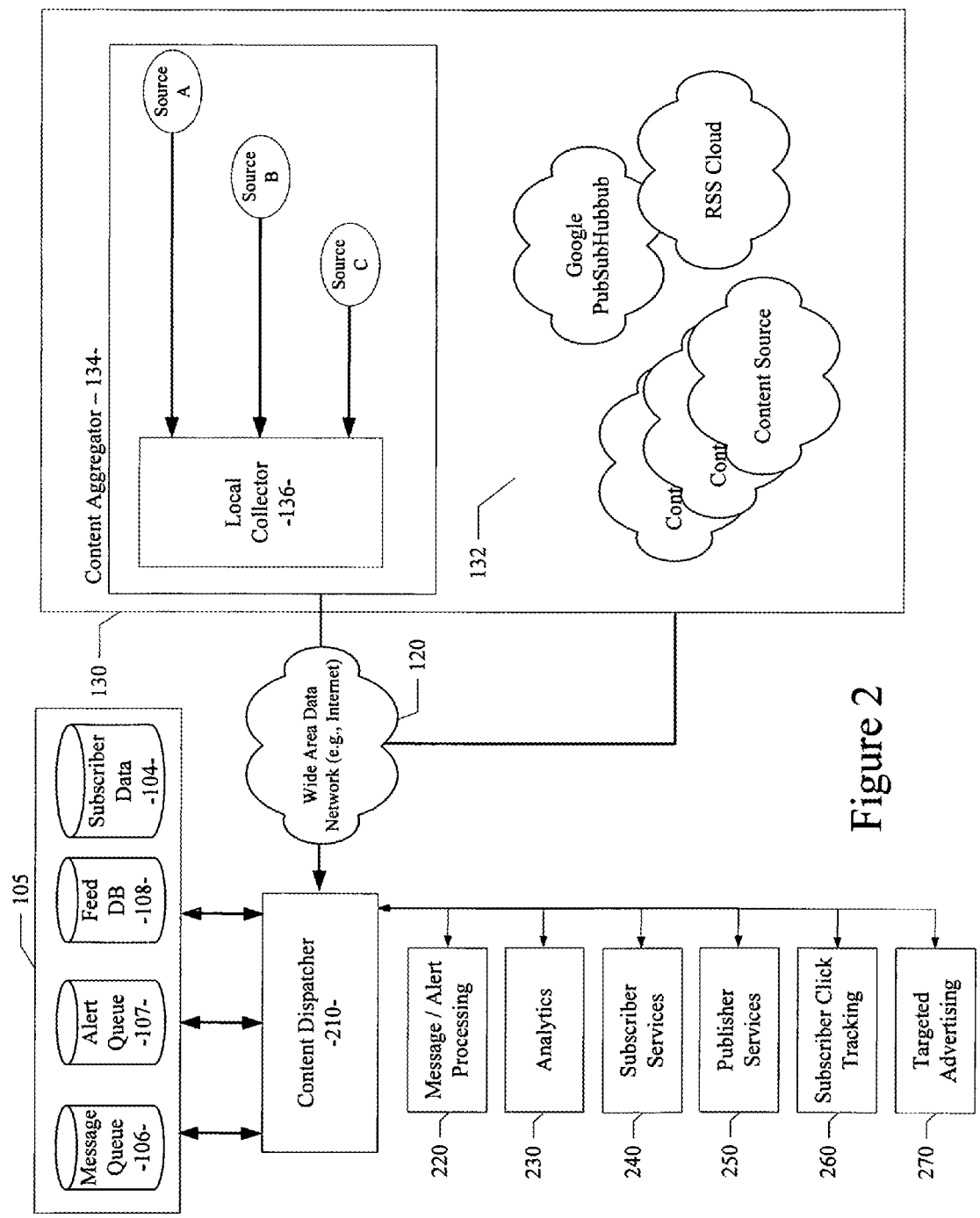
FIG. 2 illustrates a detail of the content dispatcher in an example embodiment.

Referring now to FIG. 2, a detail of the content dispatcher 210 in an example embodiment is illustrated. As shown, content dispatcher is in data communication with a plurality of content sources 130, one or more data storage devices 105, and the other processing modules 220-270 of the content management system 200. In general, the content dispatcher 210 is responsible for collecting and analyzing content feeds received from a variety of content sources 130. In a particular embodiment, these content sources 130 can include individual or clustered content sources 132 and/or aggregated content sources 134. Individual or clustered content sources 132 can include any provider of content or content feeds, such as RSS feeds. In some cases, single websites or servers can provide one or more content feeds to consumers via wide area data network 120. In other cases, clusters of content sources can provide content feeds to consumers via wide area data network 120. In one example, a content source can use a conventional RSS Cloud protocol to notify subscribers that content is available for download. RSS Cloud is an extension to the RSS 2.0 specification. In another example, conventional content sources, such as Google's PubSubHubbub provide a protocol and content feeds to consumers via wide area data network 120. PubSubHubbub is a web-hook-based publish/subscribe protocol as an extension to Atom and RSS.

Aggregated content sources 134 represent any of a variety of conventional sites or services that pull or receive content feeds from various sources (e.g., Sources A, B, and C) and collect the feeds in a local collector 136. The local collector 136 may then provide these content feeds to consumers via the wide area data network 120. The local collector 136 may also perform various operations on the received feeds, such as merging, filtering, or time-shifting prior to making the modified content feeds available via the wide area data network 120.

Content dispatcher 210 can be configured to interface with any of the content sources 130 via wide area data network 120. Because of the variety of content sources 130 providing content feeds to content dispatcher 210, the content dispatcher 210 needs to manage each feed. This feed management process includes retaining information on each feed, including an identifier or address of the corresponding content source, the timing associated with the feed, including the time when the latest feed update was received and the time when the next update is expected, and the like. This feed information can be stored in feed database 108.

The feed management process also includes determining: 1) which content feeds contain modified or new content (generally denoted a content update), 2) which subscribers have subscribed to a particular content feed, and 3) which subscribers need to be notified of a content update on a content feed to which they have subscribed. The content dispatcher 210 can use subscriber data 104 to determine the particular content feeds to which a particular subscriber has subscribed. When the content dispatcher 210 determines that a content update has been received on a content feed to which a particular subscriber has subscribed, the content dispatcher 210 can generate an alert or message to notify the subscriber of the content feed update. As will be described in more detail below, an alert or message (denoted generally herein as a notification) can be stored in an alert queue 107 or message queue 106 and forwarded when appropriate to a particular subscriber by various means. The content dispatcher 210 can use subscriber data 104 to determine the particular content feeds to which a particular subscriber has subscribed. In this manner, the content dispatcher 210 can receive content feeds from various content sources 130 and dispatch a notification to particular subscribers who are subscribers to one or more content feeds for which a content update has been received.

Figure 3:
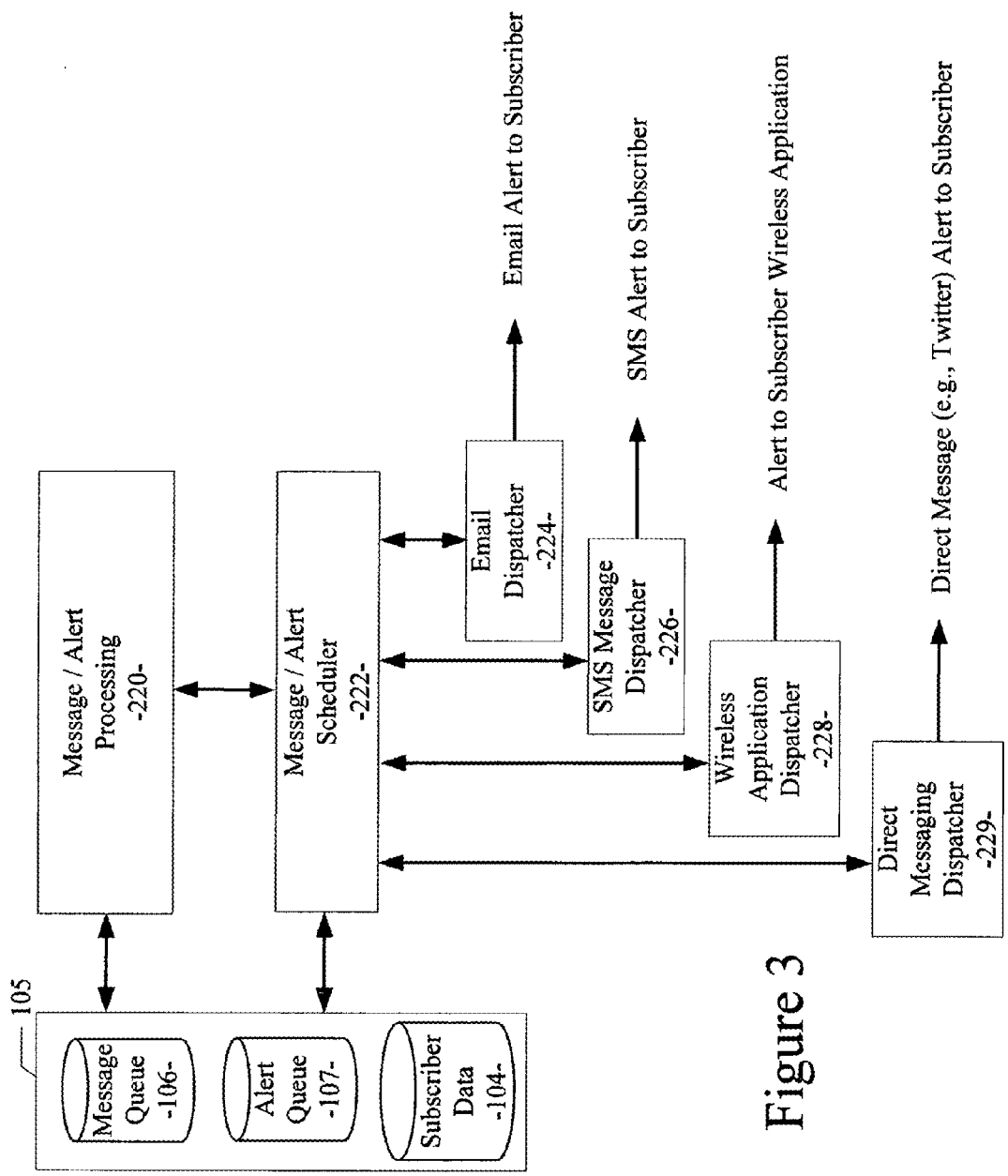
FIG. 3 illustrates detail of the message/alert processing module of an example embodiment.

Referring to FIG. 3, a detail of the message/alert processing module 220 of an example embodiment is illustrated. The message/alert processing module 220 is responsible for forwarding a notification of a content feed update to a particular subscriber when a content feed to which the subscriber has changed. The message/alert processing module 220 can access a message queue 106 and an alert queue 107 to determine which notifications are ready for output to a subscriber. As described above, the content dispatcher 210 can populate the message queue 106 and alert queue 107 with notifications as content feed updates are received. The message/alert processing module 220 can use a message/alert scheduler 222 to coordinate the delivery of notifications to subscribers using any of a variety of notification delivery mechanisms 224-229. The message/alert scheduler 222 can also provide load balancing to spread the delivery of particular notifications over a range of available time slots.

In a particular embodiment, subscribers can use a host site 10 provided user interface to optionally specify which of the variety of notification delivery mechanisms 224-229 the particular subscriber would like to use to receive content feed update notifications. This user interface is described in more detail below. In a particular embodiment, subscribers can select from several content feed update notification delivery mechanisms including: email, Short Message Service (SMS), wireless applications, and direct messaging (e.g., Twitter). It will be apparent to those of ordinary skill in the art that these particular messaging mechanisms and any other mechanisms for sending a message or an alert to a computing device, communication device, or entertainment device can similarly be used. In the particular embodiment shown in FIG. 3, the message/alert scheduler 222 can use information maintained in databases 105 for each notification stored therein to determine an identifier of a particular subscriber(s) to whom a particular notification should be delivered and by which delivery mechanism(s) the notification should be delivered. In the particular embodiment shown in FIG. 3, the message/alert scheduler 222 can send a particular notification to an email dispatcher 224, an SMS message dispatcher 226, a wireless application dispatcher 228, or a direct messaging (e.g., Twitter) dispatcher 229. Dispatchers 224-229 can use the identifier of the particular subscriber(s) provided by the message/alert scheduler 222 to configure the notification for delivery to the particular subscriber(s) using the particular delivery mechanism provided by the particular dispatcher 224-229. Any subscriber can configure his/her account preferences maintained in subscriber data 104 to specify the receipt of content feed update notifications by any or all of the notification delivery mechanisms provided by a particular embodiment. Any subscriber can also configure his/her account preferences maintained in subscriber data 104 to specify the receipt of content feed update notifications at particular times and in conformity to specific frequency and interval constraints, and other delivery policy constraints. In a particular embodiment, notifications can also be bundled in groups and delivered to a subscriber in batch. In this manner, subscribers can receive content feed notifications using any of a variety of notification delivery mechanisms and in conformity to delivery policy constraints as pre-specified by the subscriber.

Figure 4:
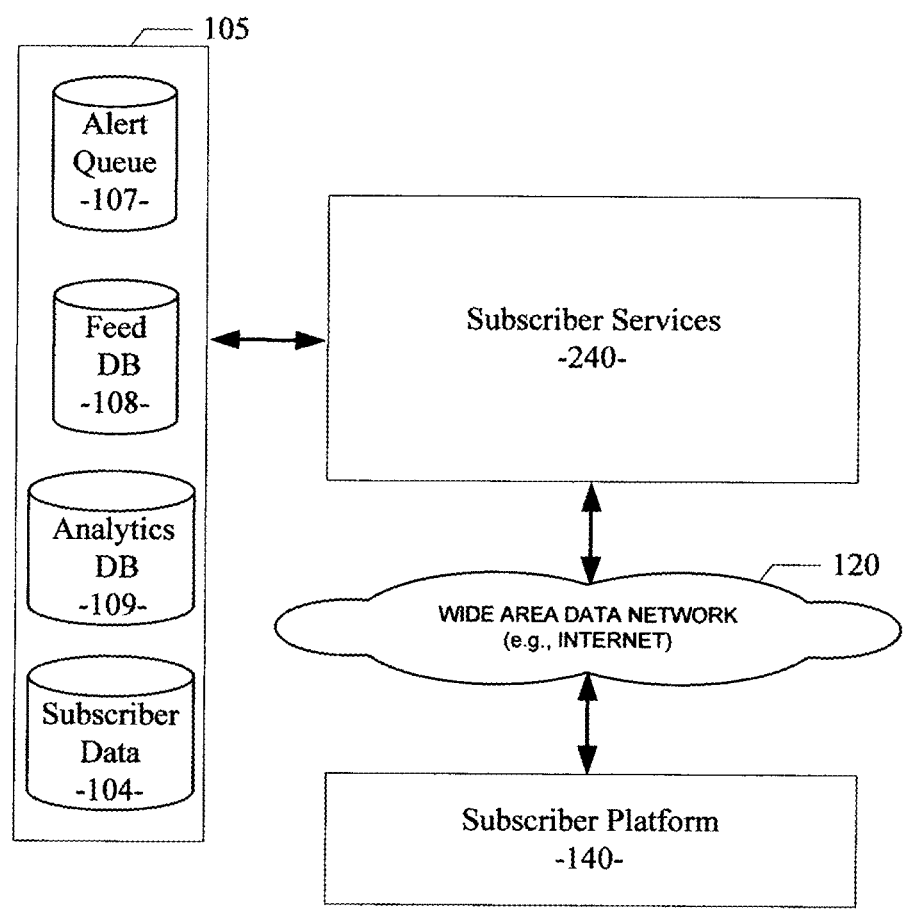
FIGS. 4 and 5 illustrate the subscriber services module of a particular embodiment.
Figure 5:
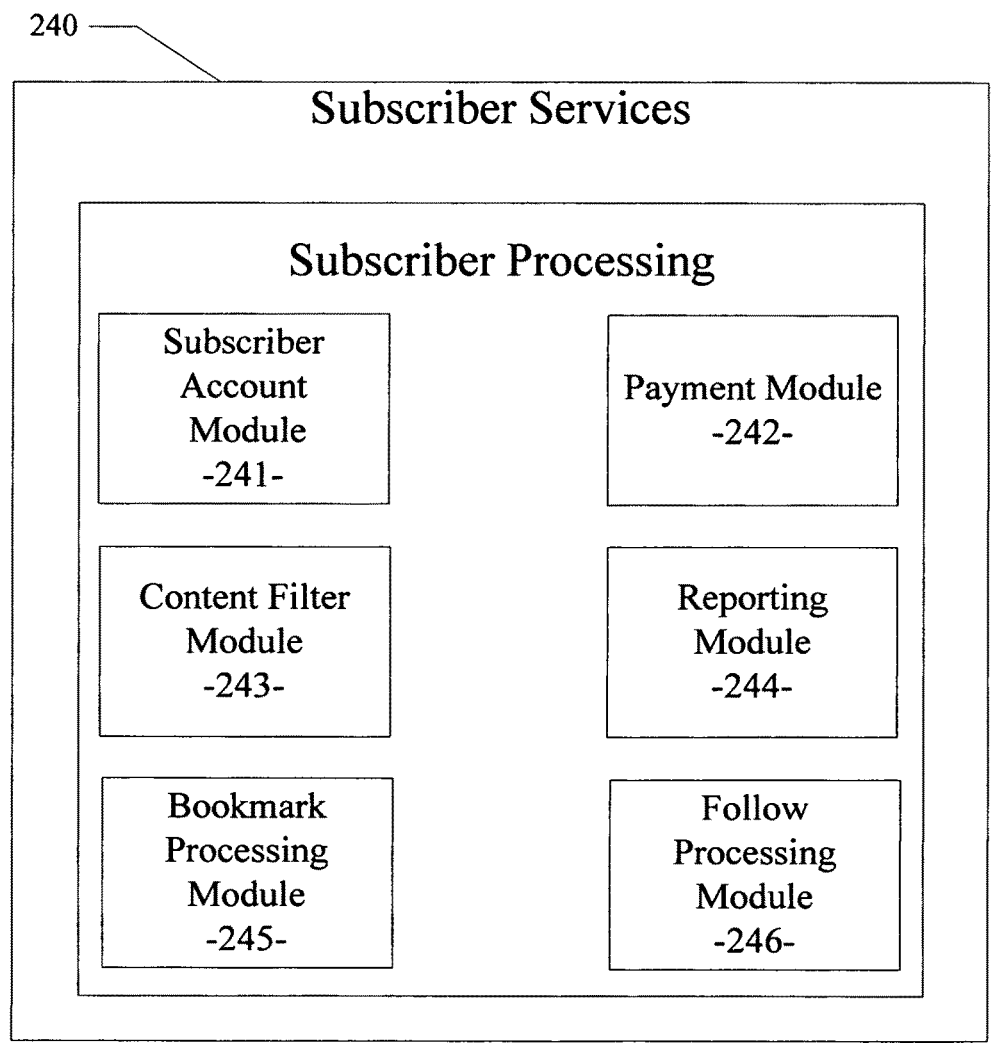

Referring now to FIGS. 4 and 5, the subscriber services module 240 of a particular embodiment is illustrated. Subscriber services module 240 provides the functionality with which a networked computer user operating from a subscriber platform 140 can become a subscriber of a content management service of host site 110 and interact with the subscriber content management services provided by the subscriber services module 240. These subscriber content management services can be implemented by several functional components provided by the subscriber services module 240. In an example embodiment shown in FIG. 5, these functional components can include a subscriber account module 241, a payment module 242, a content filter module 243, a reporting module 244, a bookmark processing module 245, and a follow function processing module 246. The subscriber account module 241 can be used to create and maintain a subscriber account on the host site 110. The subscriber account module 241 can also be used to configure subscriber settings, create and maintain a user/subscriber profile on host site 110, and otherwise manage subscriber data and operational parameters on host site 110. The subscriber data and operational parameters can be retained in database 104. The payment module 242 can be used to submit payment for a subscriber account and subscriber services. The content filter module 243, a reporting module 244, a bookmark processing module 245, and the follow function processing module 246 provide an ability for a subscriber to manage content feeds. These modules and the services they provide are described in more detail next.

As described above, the subscriber platform 140 with one or more client devices 141 enables a user/subscriber to access host site 110 via the network 120. Client devices 141 on the subscriber platform 140 may include virtually any computing device that is configured to send and receive information over a network, such as network 120. In addition to managing subscriber data and operational parameters on host site 110, subscriber services module 240 via subscriber platform 140 enables a user/subscriber to access content feeds from the content sources 130 and to receive client feed update notifications provided by message/alert processing module 220. As described in more detail below, the content filter module 243 enables a subscriber to configure a set of content feed filters that are used to define the content that is of most interest to a particular subscriber. Additionally, the reporting module 244 of subscriber services module 240 can provide a content feed subscription management page that lists each of the content feed filters to which a subscriber has subscribed along with status information and a parameter set for each content feed filter. As described in more detail below, the content feed subscription management page provides a convenient way for a user to view and control each of his/her subscribed content feed filters.

Figure 6:
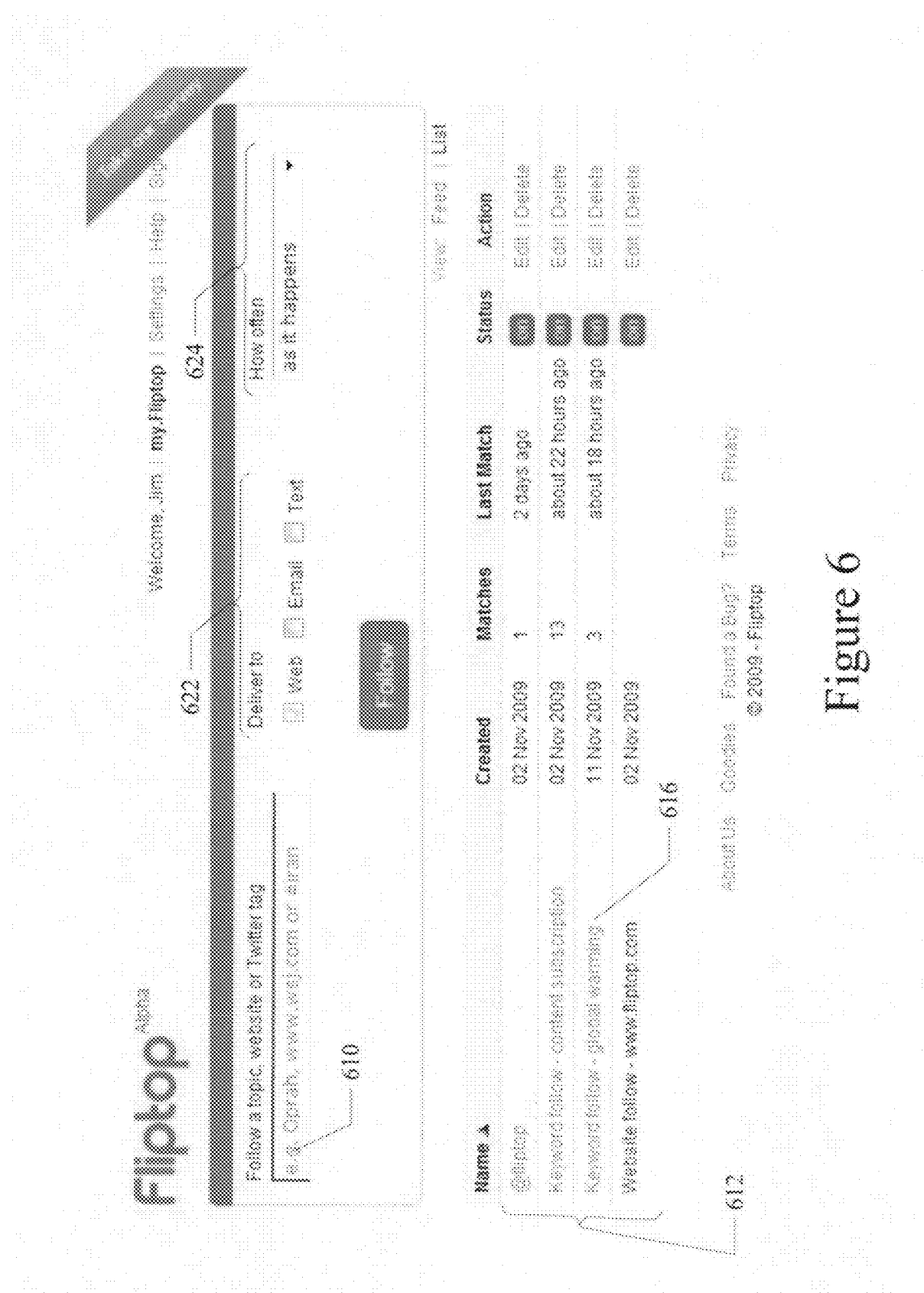
FIGS. 6-9 illustrate example display screen snapshots of a particular embodiment.

In a particular embodiment, the content filter module 243 of subscriber services module 240 can provide a content feed filter function that allows a subscriber to specify parameters associated with a content feed filter. Once specified by the subscriber, the content feed filter can be retained in database 105 and used by the content dispatcher 210 to constrain the content feed aggregation and content feed update notifications for a particular user to only those content feeds and/or content feed update notifications that conform to the subscriber specified content feed filter. For example, using a user interface provided by subscriber services module 240, the subscriber can be prompted to enter a keyword, a topic of interest, a website address, a content feed identifier, a content source or publisher identifier, an email address, an SMS code, a Twitter tag, or the like (denoted generally herein as a topic or a content feed filter). For example, see data entry area 610 as shown in the example of FIG. 6. The subscriber-entered data (e.g., topic or content feed filter) is retained in subscriber data 104 and a record is created in the subscriber's content feed subscription management page also shown in the example of FIG. 6. In this manner, a subscriber can specify a set of user-defined content feeds in which the subscriber is interested. The subscriber's content feed subscription management page can include a plurality of user-defined content feeds as specified by a plurality of different content feed filters. In the example shown in FIG. 6, a subscriber has used the user interface provided by subscriber services module 240 to set up four content feed filters 612 (e.g., Twitter tag: @fliptop, keyword: 'content subscription', keyword: 'global warming', and website: www.fliptop.com). As a result of this sample configuration of content feed filters, the subscriber can receive content feeds that contain or are related to the topics specified in the content feed filters. In another embodiment, the subscriber can also specify additional qualifiers to further specify the content of interest. The subscriber can set up threshold qualifiers that define conditions that must be met before an alert is sent to the subscriber, For example, a subscriber can subscribe to content from a ski resort website and further specify that content update alerts should be sent to the subscriber only when the content on the website indicates that the base snow depth at the ski resort has exceeded 50 inches. In another example, a subscriber can subscribe to travel-related content sources and further specify that content update alerts should be sent to the subscriber only when the content on the website indicates that a particular flight has been canceled or the flight is due to arrive in less than two hours. It will be apparent to those of ordinary skill in the art that a variety of other conditional threshold qualifiers can be used to filter the content and to specifically define the particular content of interest. In other words, by configuring the content feed filters as described herein, the subscriber can subscribe to one or more content feeds related to topics and/or content feed categories of interest. Further, the subscriber can receive notifications when any content feed updates are received for any of the content feeds that contain or are related to the topics specified in the content feed filters. Each content feed filter can be listed on the content feed subscription management page with status information, update timing information, and notification status information associated with each content feed filter. This additional information for each content feed filter 612 is also shown in the example of FIG. 6.

The topics or content feed filters specified by a subscriber can represent user-provided affinity indicators that describe the types or categories of content of interest to a particular subscriber. As described herein, these user-provided affinity indicators can be used by the content dispatcher 210 to filter the received content feeds and provide a subscriber with a summary of each content feed that matches a particular content feed filter. In this manner, a subscriber can quickly scan through a set of content summaries that match a particular user-specified topic. The received content feeds can be matched to a particular user-specified topic based on exact or partial matches of the content feed filter (e.g., keywords, URLs, Twitter tags, etc.) with content from the content feed or using conventional relevancy processors that match search terms with webpage content. Once matching content feeds are identified, a summary or extract of the matching content feed can be generated and displayed on the subscriber's content feed subscription management page. Additionally, user affinity for specific content may be aggregated to generate one or more global relevancy scores. These relevancy scores can be maintained for a particular subscriber and maintained for groups of subscribers. The relevancy scores can be used to train a learning algorithm for establishing automatic filtering thresholds for filtering future content updates for a particular subscriber or groups of subscribers.

Figure 7:
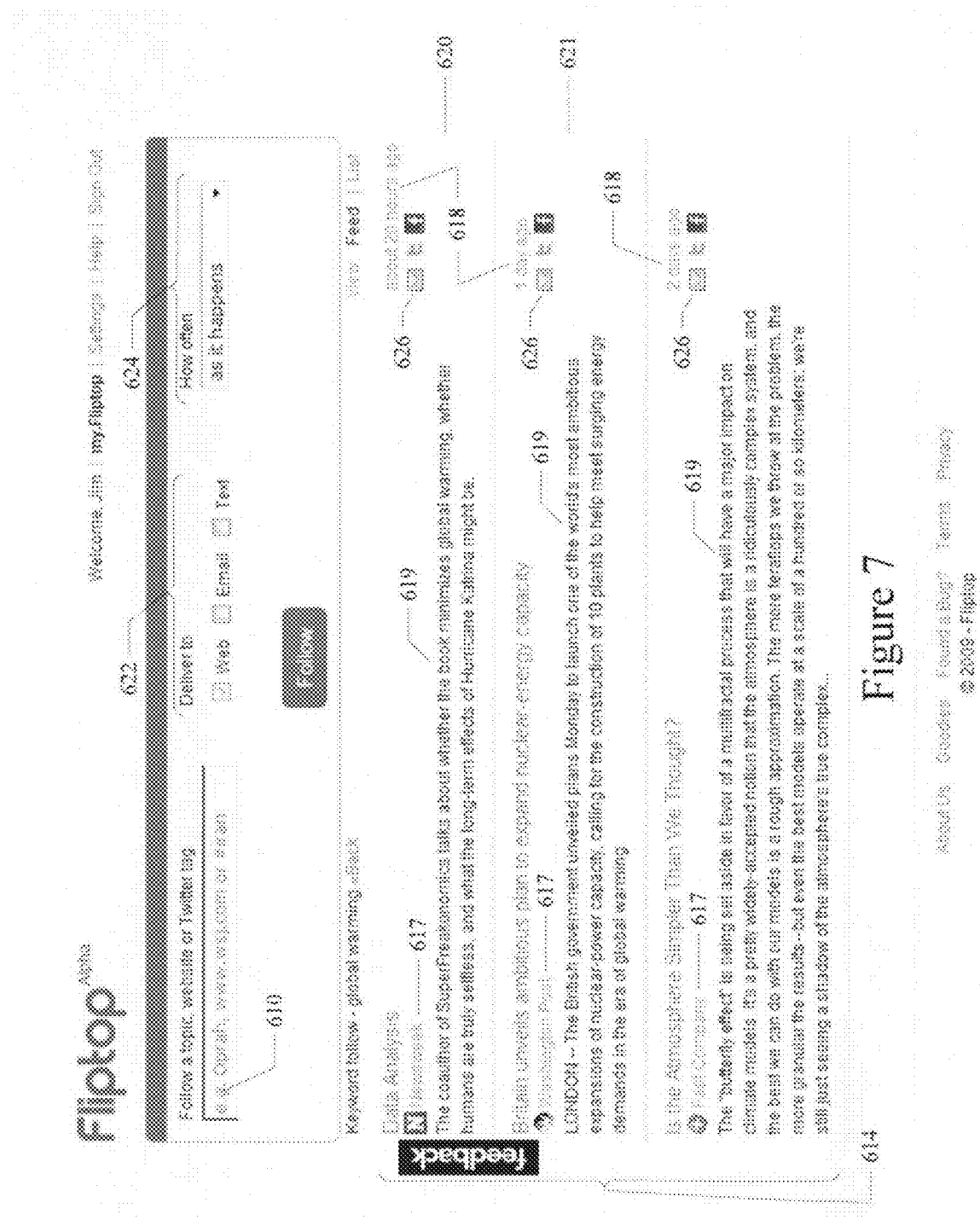

For example, FIG. 7 illustrates a sample listing of content feed summaries 614 that were matched to the content feed filter keyword, 'global warming' 616 shown in FIG. 6. Each of the matching content feed summaries includes an identifier of the content source 617 and timing information 618 that specifies the time frame when the content feed was most recently updated. Each of the matching content feed summaries also includes a summary or extract 619 of the particular content feed. In a particular embodiment, the list of matching content feed summaries can be sorted by the update time frame. In the example shown in FIG. 7, the summary of the most recently updated content feed that matches the content feed filter affinity indicators is displayed in the topmost location 620 of the allocated portion of the page followed by the next most recently updated content feed summary that matches the content feed filter affinity indicators in the next lower display location 621 and so on. In this manner, the subscriber is provided with a time-based view of the most relevant and recent content. The reporting module 244 can be used to provide this time-based view. The subscriber can thereby conveniently view the most recent content feed summaries for the topics in which the subscriber is most interested.

Once the subscriber configures a set of content feed filters using the content filter module 243 as described above, the subscriber can also configure the messaging and alerting functionality provided by the message/alert processing module 220 through the user interface of the subscriber services module 240. Referring again to the example of FIG. 6, a subscriber can select from a plurality of notification delivery options 622 (e.g., web, email, or text). The subscriber can also specify a temporal option 624 that defines a frequency or interval at which content feed update notifications can be delivered to the subscriber. Thus, using the user interface controls provided by a particular embodiment and shown by example in FIG. 6, a subscriber can specify a content feed filter affinity indicator (e.g., keywords, URLs, Twitter tags, etc.) with an associated notification delivery mode and delivery timing. Subsequently, when a content feed update is received that matches the subscriber-defined content feed filter, the subscriber is automatically notified of the content feed update using the subscriber-defined delivery mode and delivery timing. If the subscriber chooses a web delivery mode, a content feed update notification is delivered to the subscriber via a message when the subscriber visits the host site 110. If the subscriber chooses an email delivery mode, a content feed update notification is delivered to the subscriber via an email to a pre-defined email address. If the subscriber chooses a text delivery mode, a content feed update notification is delivered to the subscriber via an SMS text message, Twitter tweet, pager message, wireless application device message, and/or the like. The subscriber-configured content feed update notification delivery mode is also shown adjacent 626 to each content feed summary of the sorted list of content feed summaries shown in the example of FIG. 7. As described above, these content feed parameters or affinity indicators can be readily configured or modified by a subscriber using the user interface provided by the subscriber services module 240 of an example embodiment.

Thus, filtered content feed subscription and alerting based on relevance to user-provided affinity indicators (e.g., keywords, URLs, Twitter tags, etc.) across multiple content sources is provided by various embodiments. Further, filtered content feed subscription and alerting based on relevance to user-provided affinity indicators enables messages/alerts to be configurably delivered to a subscriber via a webpage, email, SMS, Twitter, or other delivery mode as provided by various embodiments. The delivery of messages/alerts to the subscriber can also be configured according to temporal parameters. As described herein, particular embodiments also provide a content feed filter-by-category/topic option and present relevant filtered content summaries in a time-based view at a host site.

Figure 8:
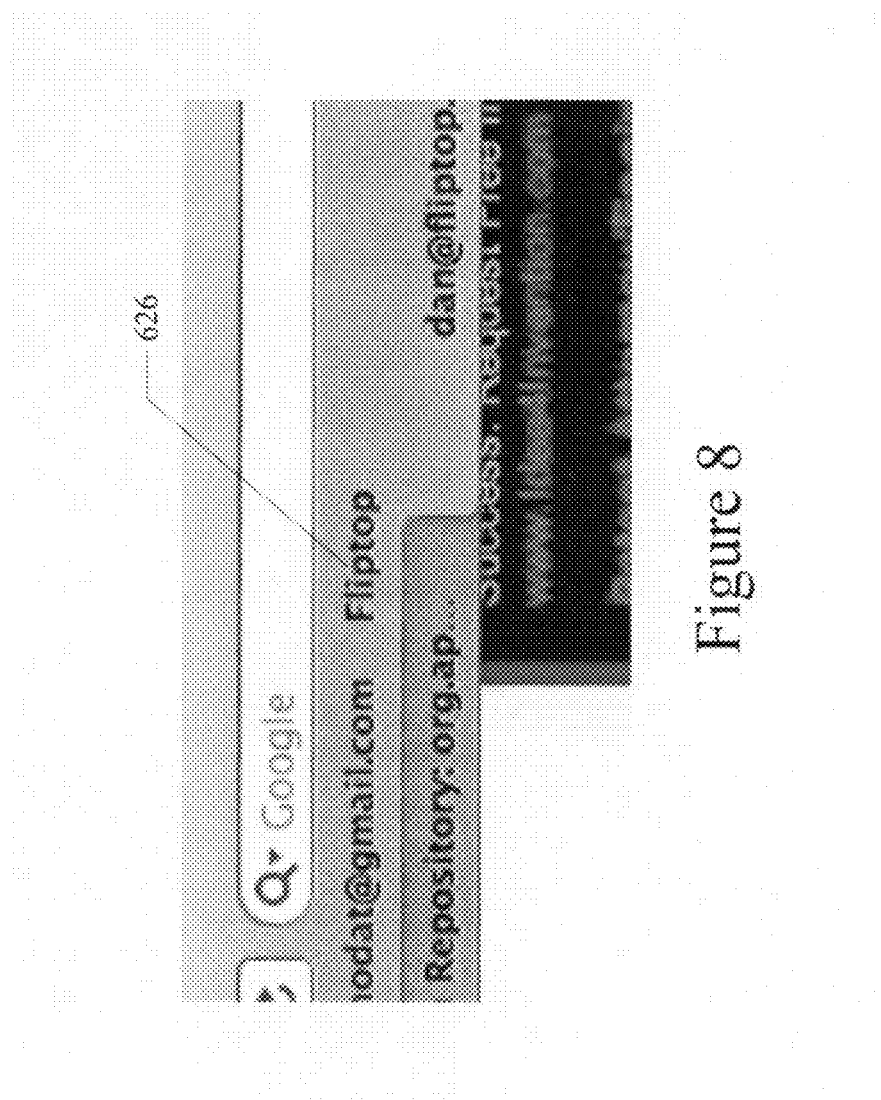
Figure 9:
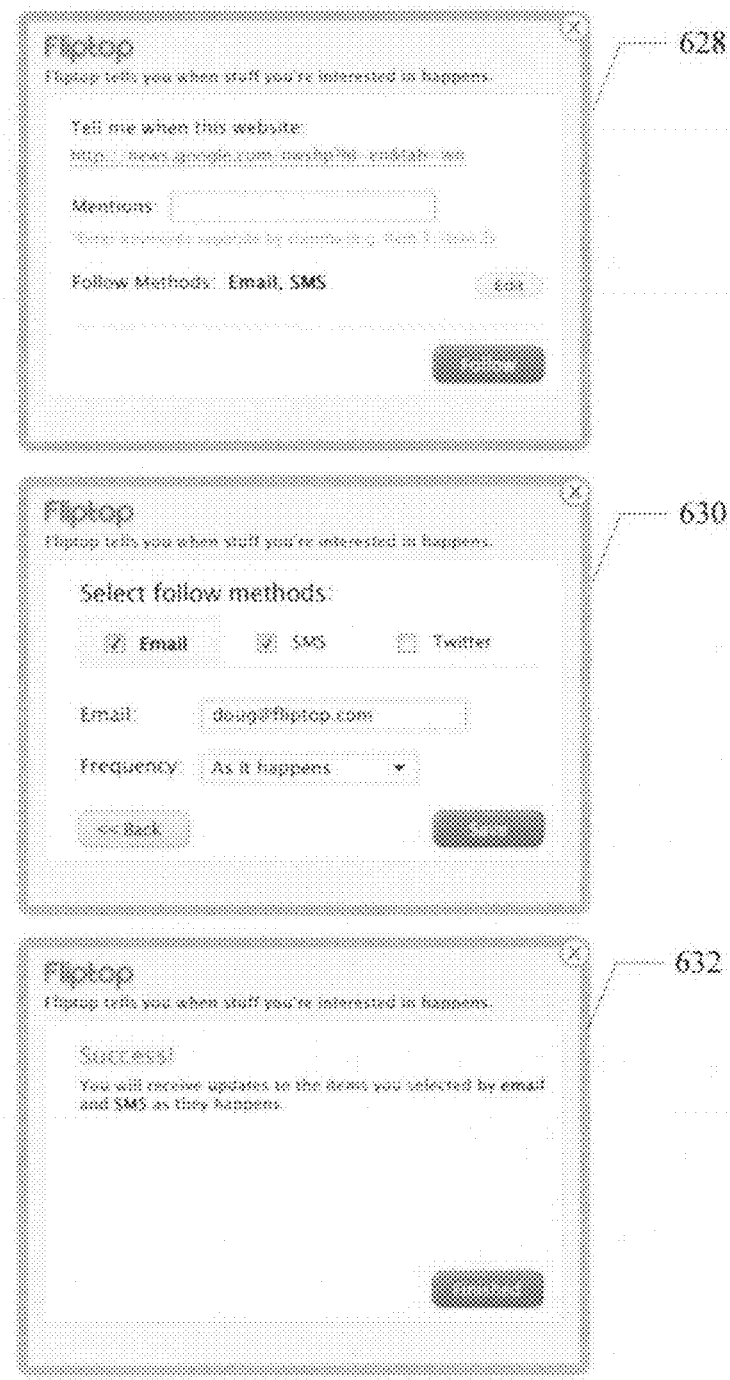

Referring still to FIG. 5, the subscriber services module 240 provides a bookmark processing module 245 and a follow function processing module 246. The bookmark processing performed by bookmark processing module 245 enables a user to insert a user-selectable button, icon, softkey, tab, or other user-selectable object (denoted herein as a bookmark button) into a browser bar of a conventional web browser. The bookmark button includes a link to the host site 110. The bookmark button enables the user to subscribe to content from any website and to receive content update alerts based on the content of any website. If the website has not previously been subscribed by a user, the host site 110 can communicate with the website to determine if the site is RSS-enabled. This can be determined by parsing the HTML code on the site. If the site is determined to be RSS-enabled, host site 110 can further determine which protocol can be used to get content updates from the site (e.g., PubSubHubbub, RSS Cloud, or other protocol). If the site is determined to be not RSS-enabled, host site 110 can configure the periodic scheduling of content gathering from the site using a crawler or screen scraper. The content gathered from the site can be used to determine if the content on the site has been updated. The website address, any related protocol information, and any content update information is added to the feed database 108 on the host site 110. An example of a bookmark button 626 is illustrated in FIG. 8. A user can activate the bookmark button 626 using a cursor control device or mouse and a select key or using other conventional means. Upon activation of the bookmark button 626 by a visitor to a webpage, the user is prompted with a series of dialog prompts, with which a user can readily subscribe to the content on the webpage. An example of these bookmark button 626 dialog prompts 628-632 are shown in FIG. 9. As illustrated, the first dialog prompt 628 enables the user to specify one or more keywords or affinity indicators through which the content of the website can be filtered. In this manner, the user can specifically identify the topics or categories of content on the particular website that is of interest to the user. The user can thereby become a subscriber to the content on the website. Once the user is a subscriber to the content on the website, the user is automatically notified by the message/alert processing module 220 when any updated content matching the user-specified affinity indicators is posted on the website. Using the dialog prompt 630, the user can specify the notification delivery mode the user wishes to use for delivery of notifications of updated content feeds on the particular website. As shown, the user can select to be notified by email, SMS text messaging, or a Twitter direct message. It will be apparent to those of ordinary skill in the art that other notification modes can be provided in an alternative embodiment. The user can also specify temporal parameters, such as a frequency or interval at which notification is provided. When the user has completed the input of prompted data, the user is configured as a subscriber to the website and set up to receive notifications of content updates on the website via the delivery modes and temporal parameters as specified. The user is so advised in a dialog prompt 632 shown in the example of FIG. 9.

Figure 10:
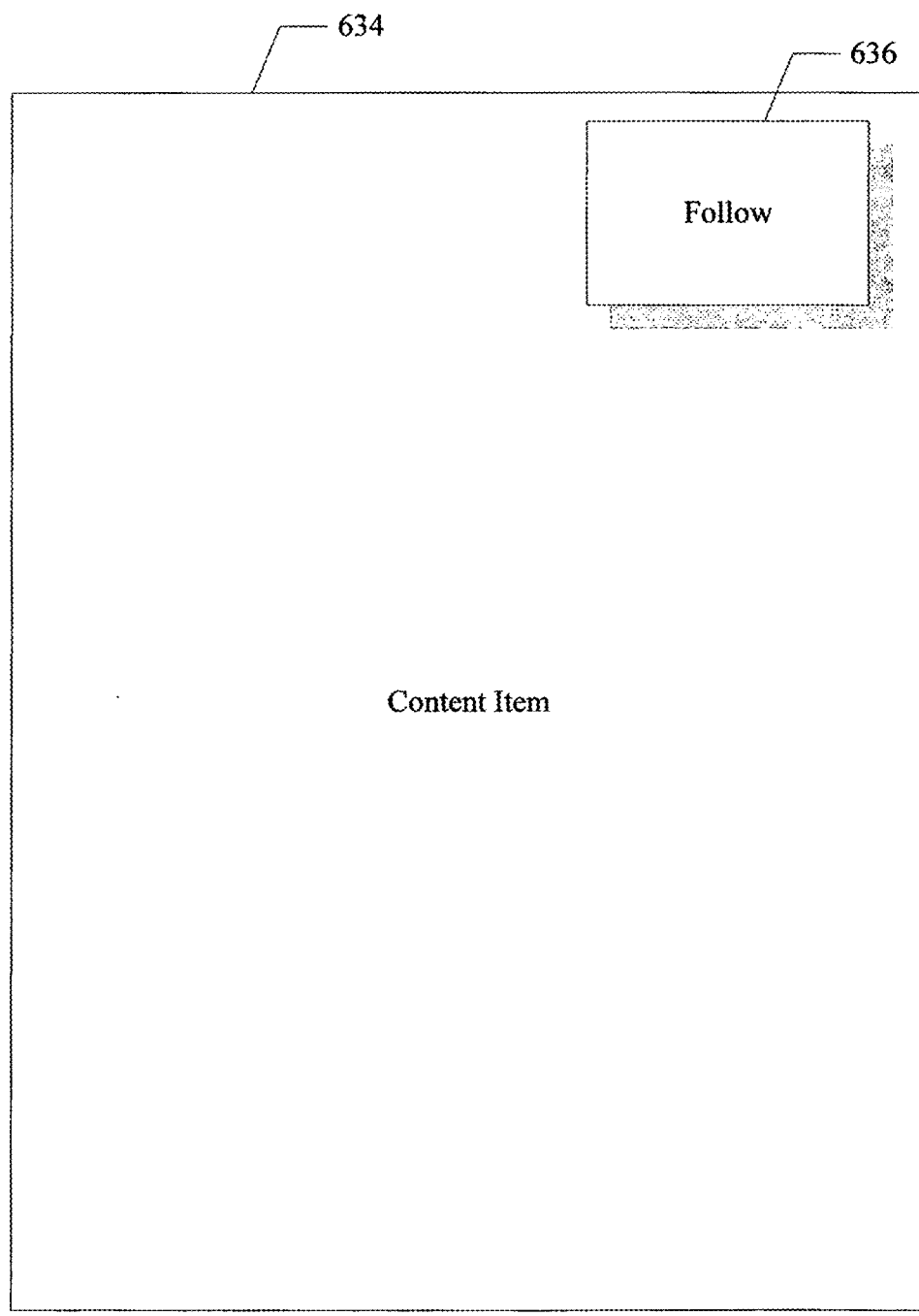
FIG. 10 illustrates an example of a follow button in a particular embodiment.
Figure 11:
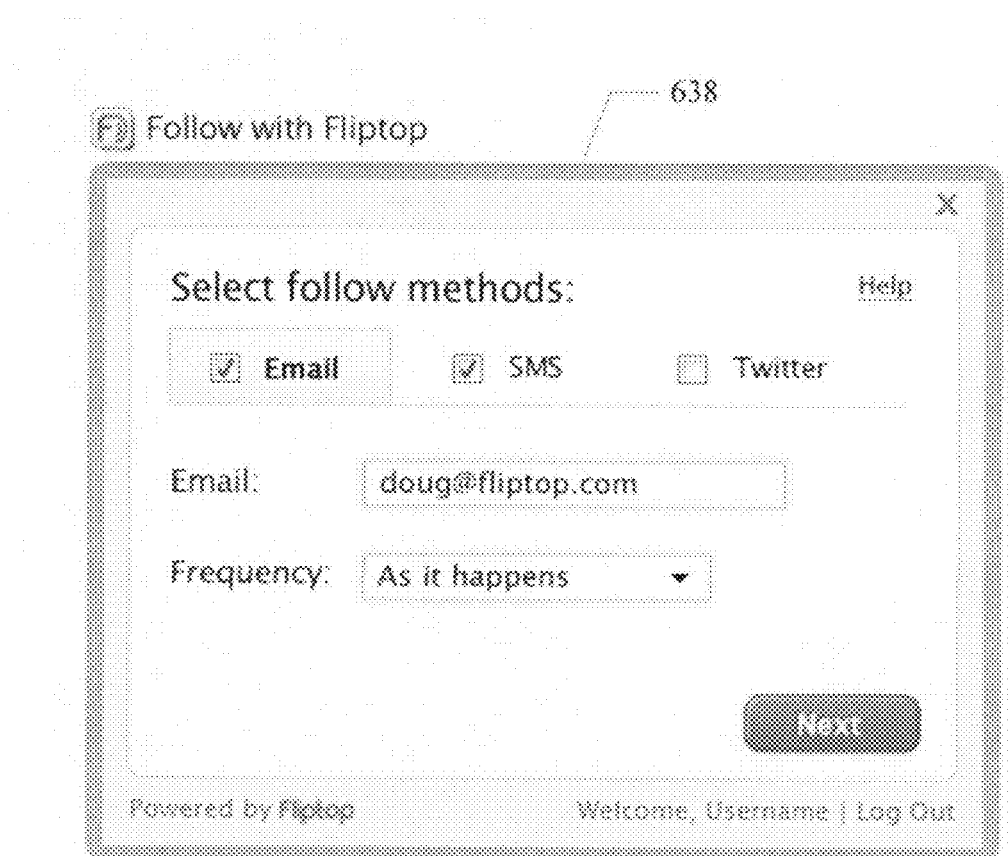
FIGS. 11-13 illustrate other example display screen snapshots of a particular embodiment.
Figure 12:
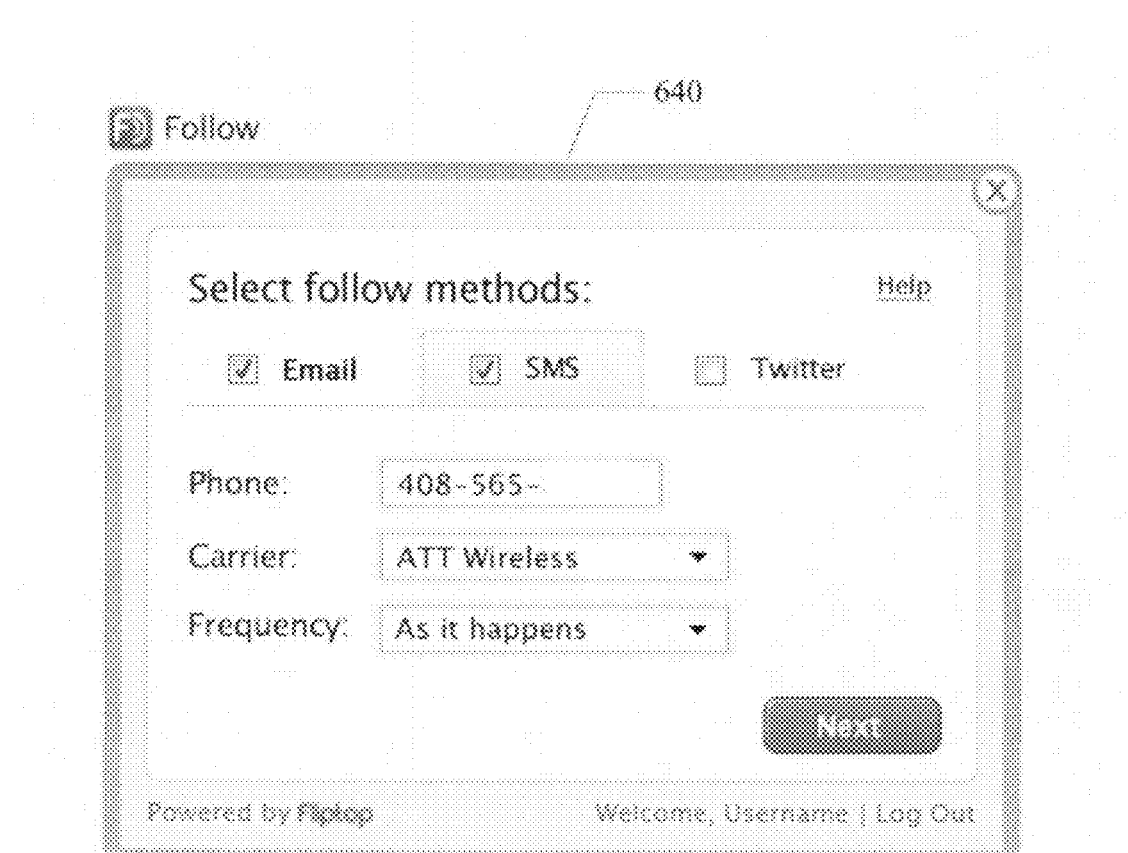
Figure 13:
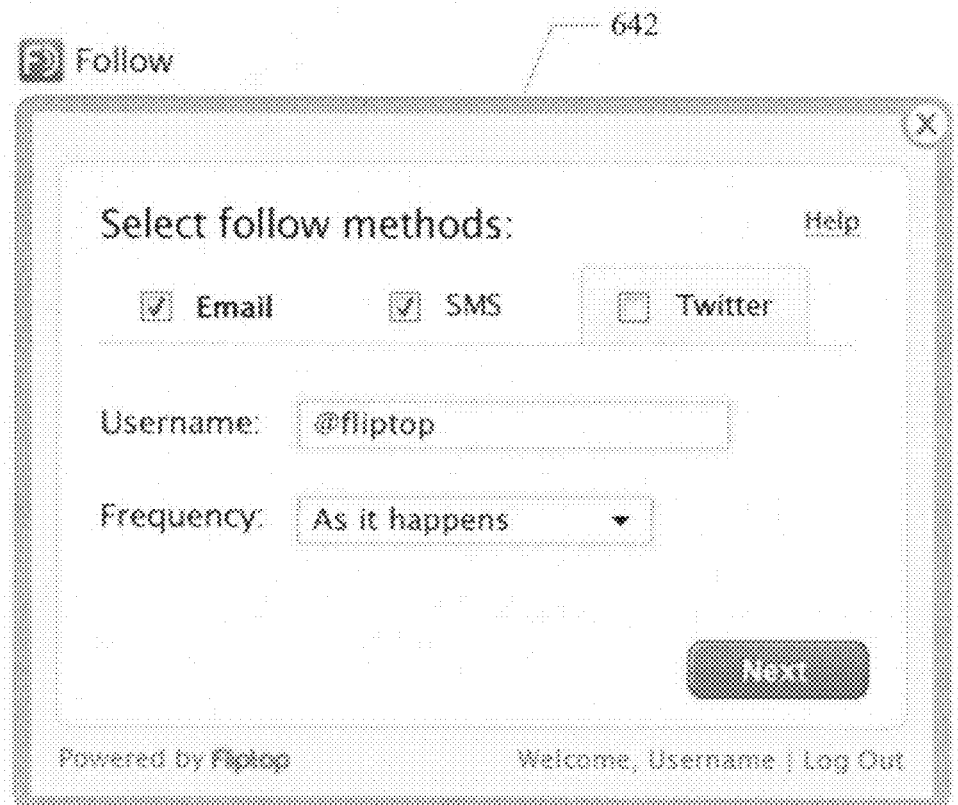

The subscriber services module 240 also provides a follow function processing module 246. The follow function processing performed by follow function processing module 246 enables a publisher of content to insert a user-selectable widget, button, icon, softkey, tab, or other user-selectable object (denoted herein as a follow button) on one or more pages of a particular content item. As used herein, a widget is an element of a graphical user interface (GUI) that displays an information arrangement changeable by the user, such as a window or a text box. The defining characteristic of a widget is to provide a single interaction point for the direct manipulation of a given kind of data. In other words, widgets are basic visual building blocks which, combined in an application, hold all the data processed by the application and the available interactions on this data. An example of a follow button 636 in a particular embodiment is illustrated in FIG. 10. A user can activate the follow button 636 using a cursor control device or mouse and a select key or using other conventional means. Upon activation of the follow button 636 by a user accessing the content item 634, the user is prompted with a series of dialog prompts, with which a user can readily subscribe to the content item 634 and the source of the content item 634. An example of these follow button 636 dialog prompts 638-642 are shown in FIGS. 11-13. As illustrated, the first dialog prompt 638 shown in FIG. 11 enables the user to specify an email notification delivery mode that the user wishes to use for delivery of notifications of updated content in the particular content item 634. The user can thereby become a subscriber to the content of the particular content item 634. Once the user is a subscriber to the content of the particular content item 634, the user is automatically notified by the message/alert processing module 220 when any updated content is posted in the particular content item 634. Using the dialog prompt 640 shown in FIG. 12, the user can specify the SMS text message notification delivery mode that the user wishes to use for delivery of notifications of updated content in the particular content item 634. Similarly, as shown in FIG. 13, the user can also specify a Twitter direct message notification delivery mode that the user wishes to use for delivery of notifications of updated content in the particular content item 634. Thus, the user can select to follow (i.e., subscribe to) the content of the particular content item 634 in which the follow button 636 is embedded. Once so subscribed, the user is notified by email, SMS text messaging, or a Twitter direct message when the content in the content item 634 is updated. It will be apparent to those of ordinary skill in the art that other notification modes can be provided in an alternative embodiment. As shown in dialog prompts 638-642, the user can also specify temporal parameters, such as a frequency or interval at which notification is provided. When the user has completed the input of prompted data, the user is configured as a subscriber to the content item and set up to receive notifications of content updates in the content item via the delivery modes and temporal parameters as specified.

Figure 14:
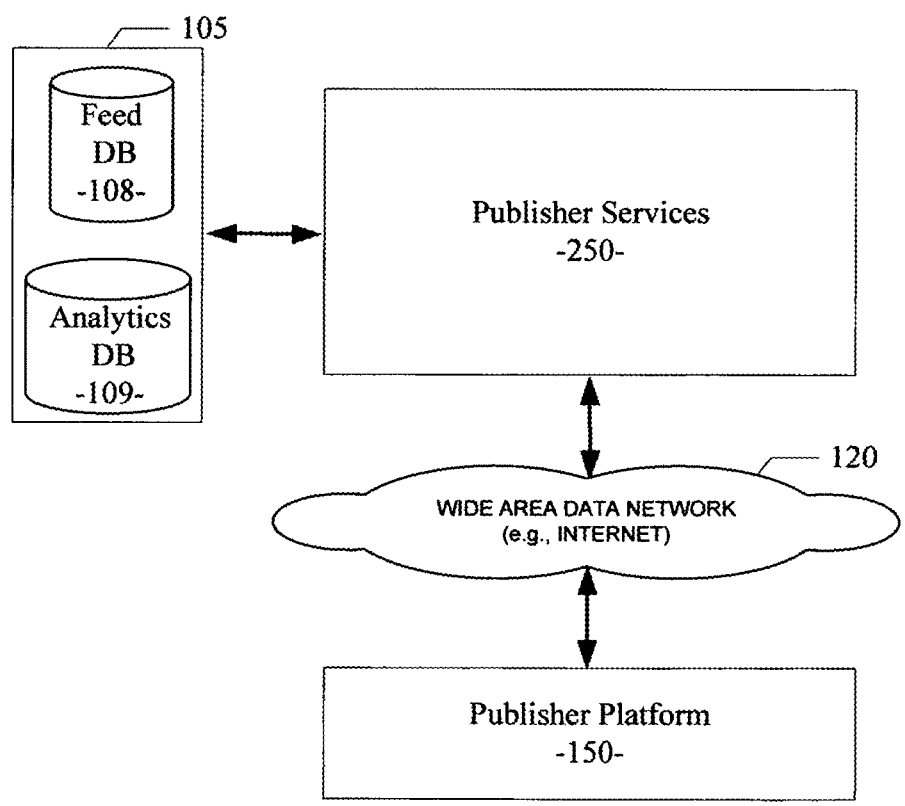
FIGS. 14-15 illustrate the publisher services module of a particular embodiment.
Figure 15:
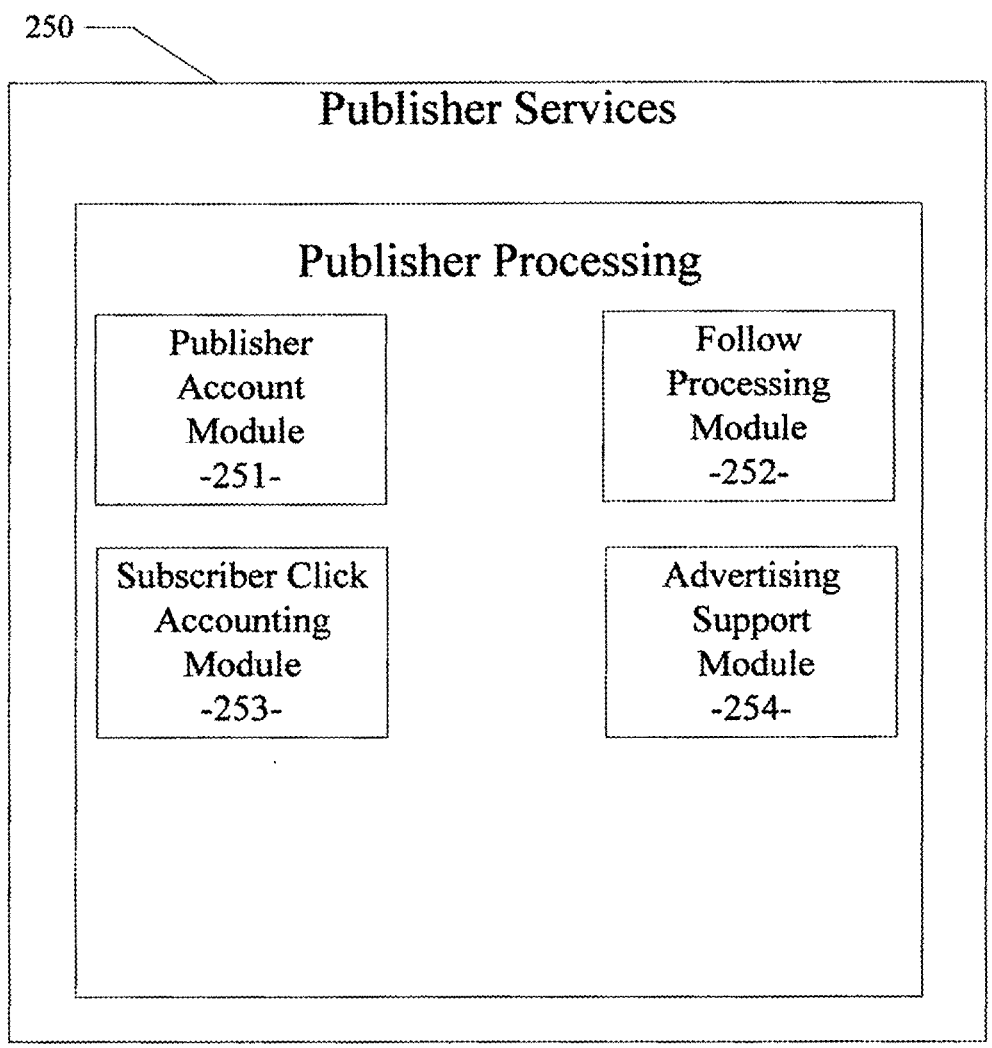

Referring now to FIGS. 14-15, the publisher services module 250 of a particular embodiment is illustrated. Publisher services module 250 provides the functionality with which a networked computer user operating from a publisher platform 150 can become a publishing partner of the content management service of host site 110 and interact with the publisher content management services provided by the publisher services module 250. These publisher content management services can be implemented by several functional components provided by the publisher services module 250. In an example embodiment shown in FIG. 15, these functional components can include a publisher account module 251, a follow processing module 252, a subscriber click accounting module 253, and an advertising support module 254. The publisher account module 251 can be used to create and maintain a publisher account on the host site 110. The publisher account module 251 can also be used to configure publisher settings, create and maintain a publisher profile on host site 110, and otherwise manage publisher data and operational parameters on host site 110. The publisher data and operational parameters can be retained in database 105. The follow processing module 252, a subscriber click accounting module 253, and advertising support module 254 provide an ability for a publisher to manage its content feeds and the user activity related to the publisher content. These modules and the services they provide are described in more detail next.

A publisher may be a website provider on which content is published or a provider of one or more content items that may be published on a website or other network source. In either case, the follow processing module 252 of an example embodiment provides the tools necessary for a publisher to implement a follow button 636 (e.g., see FIG. 10) in a publisher content item 634.

In regard to implementing the follow button 636 in a publisher content item 634, the follow processing module 252 provides a follow button installation module that may be executed by a publisher at the publisher platform 150. The follow button installation module enables the publisher to embed a follow button 636 in one or more publisher content items 634. The follow button 636 can be configured to link a user activating the follow button back to the host site 110 for processing the user's follow content request. The publisher may also use the follow button installation module to provide or configure any authorizations or revenue-sharing policies needed for enabling a user/subscriber to subscribe to one or more publisher content items 634. Upon completion of the follow button installation process, a follow button 636 appears on the one or more publisher content items 634 and enables users to subscribe to content provided therein. As part of being subscribed to the website content or the content in a particular content item, the user/subscriber' can also be configured to receive content update notifications as described above.

The publisher services module 250 of a particular embodiment includes a subscriber click accounting module 253. The subscriber click accounting module 253 provides functionality with which the host site 110 and particular publishers using publisher platforms 150 can track the interaction of users/subscribers with the publisher content. For example, as described above, users can subscribe to content on websites, content feeds, or other content sources. These content subscriptions, and the publishers who provide the content, can be correlated by host site 110. The host site 110 can provide a particular publisher with detailed information on the types of subscribers who subscribed to that publisher's content. For example, the host site 110 can profile the subscribers for a particular publisher based on the subscriber's demographic information, the subscriber's content interests, the relationship of the subscriber to other subscribers or other content sources, and the like. The subscriber information provided to the publishers can be made anonymous to protect the identity and privacy of the subscribers. In addition, the host site 110 can track subscriber interactions with the content based on mouse clicks, views, saves, prints, copies made of particular content items, purchases, bids, or subscriber responses to content update alerts for particular content items. As described above, the content management system 200 of an example embodiment can provide a listing of content feed summaries 614. Each item in the listing 614 can represent a particular item of content. The subscriber can click on these items in listing 614 to view the entire content item. The content management system 200 can track these subscriber clicks to assist in the implicit determination of subscriber affinity. Additionally, the content feed filters, as described above, that are specified by a particular subscriber can be processed and normalized to further assist in the implicit determination of subscriber affinity. Any or all of this detailed subscriber information can be provided to an authorized publisher or other authorized third party via a web interface or an application programming interface (API) provided by subscriber click accounting module 253.

The publisher services module 250 of a particular embodiment includes an advertising support module 254. Given the detailed subscriber information captured and processed by the subscriber click accounting module 253, the content management system 200 can determine subscriber affinity in a variety of dimensions. For example, the subscriber affinity information can be correlated to determine the types of content in which the subscriber is most interested. These content types can be defined in varying levels of granularity from broad content categories to specific content items. Once these content types for a particular subscriber are determined, corresponding advertising types can be determined. The determined advertising types for a particular subscriber can be used to find particular advertising items (ads) from an inventory of advertising maintained by the advertising support module 254. These ads can be served to the particular subscriber at various times, such as when the subscriber clicks on a content item that correlates to a particular advertising item. In this manner, the advertising support module 254 enables the content management system 200 to facilitate targeted advertising to subscribers.

Figure 16:
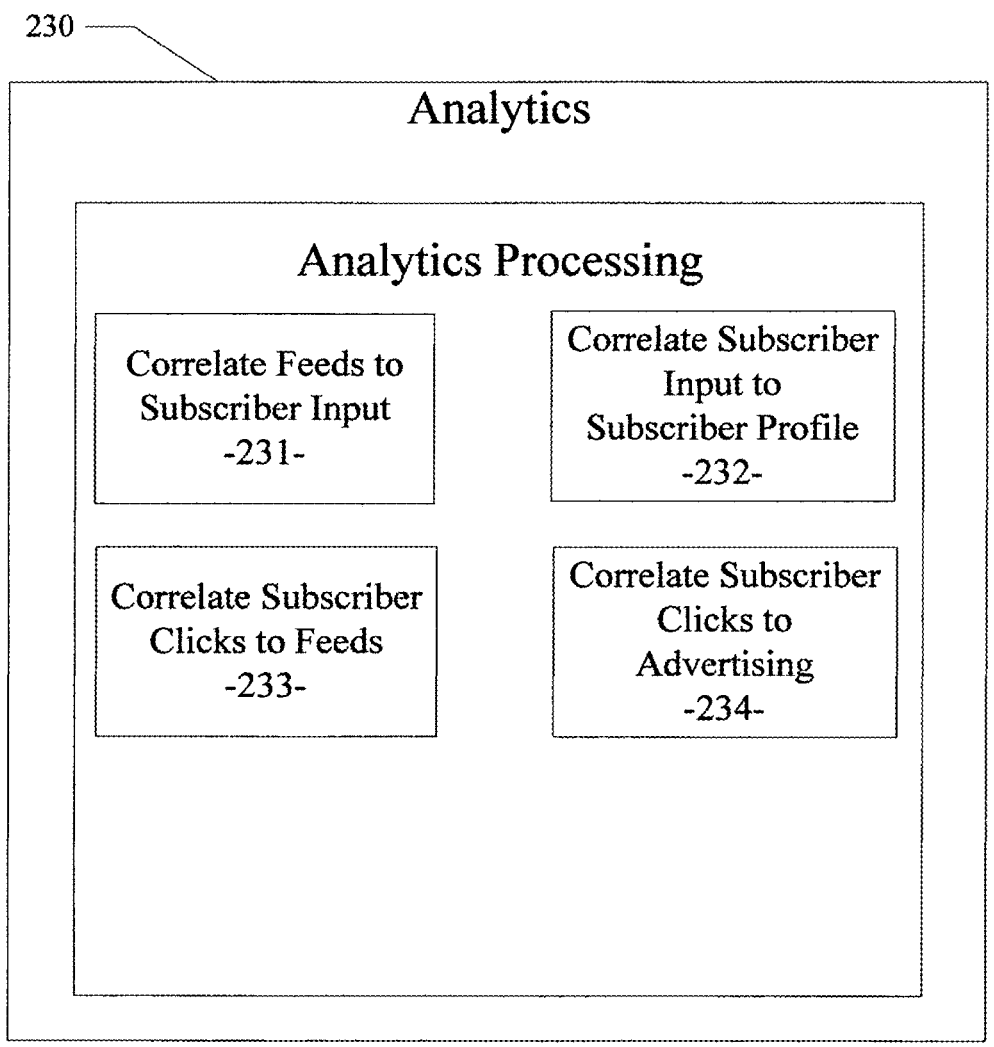
FIG. 16 illustrates the analytics module of a particular embodiment.

Referring now to FIG. 16, the analytics module 230 of an example embodiment is illustrated. Analytics module 230 provides the functionality with which the content management system 200 can process and provide a variety of analytic information services based on information obtained from the interaction of subscribers with content. These analytics services can be implemented by several functional components provided by the analytics module 230 of an example embodiment. In an example embodiment shown in FIG. 16, these functional components can include a first correlation module 231 to correlate various content feeds to subscriber input, a second correlation module 232 to correlate subscriber input to the subscriber profile, a third correlation module 233 to correlate subscriber click activity to the various content feeds, and a fourth correlation module 234 to correlate subscriber click activity to the various advertising items. The first correlation module 231 determines relationships between the content of various content feeds and the content feed filters input by the subscribers. The first correlation module 231 tries to determine how relevant a particular content item is to a particular subscriber based on the subscriber's defined content feed filters. The second correlation module 232 determines relationships between the content of various content feeds and the subscriber profiles expressly input by the subscribers. The second correlation module 232 tries to determine how relevant a particular content item is to a particular subscriber based on the subscriber's explicit profile. The third correlation module 233 determines relationships between the content of various content feeds and the subscriber affinity based on clicks of particular content items by the subscribers. The third correlation module 233 tries to determine how relevant a particular content item is to a particular subscriber based on the subscriber's implicit affinity. The fourth correlation module 234 determines relationships between the various advertising items and the subscriber affinity based on clicks of particular content items by the subscribers. The fourth correlation module 234 tries to determine how relevant a particular advertising item is to a particular subscriber based on the subscriber's affinity. In each case, the analytics module 230 processes correlations between subscribers, content, and advertising. Any or all of this detailed analytics information can be provided to an authorized publisher or other authorized third party via a web interface or an application programming interface (API) provided by analytics module 230.

Figure 17:
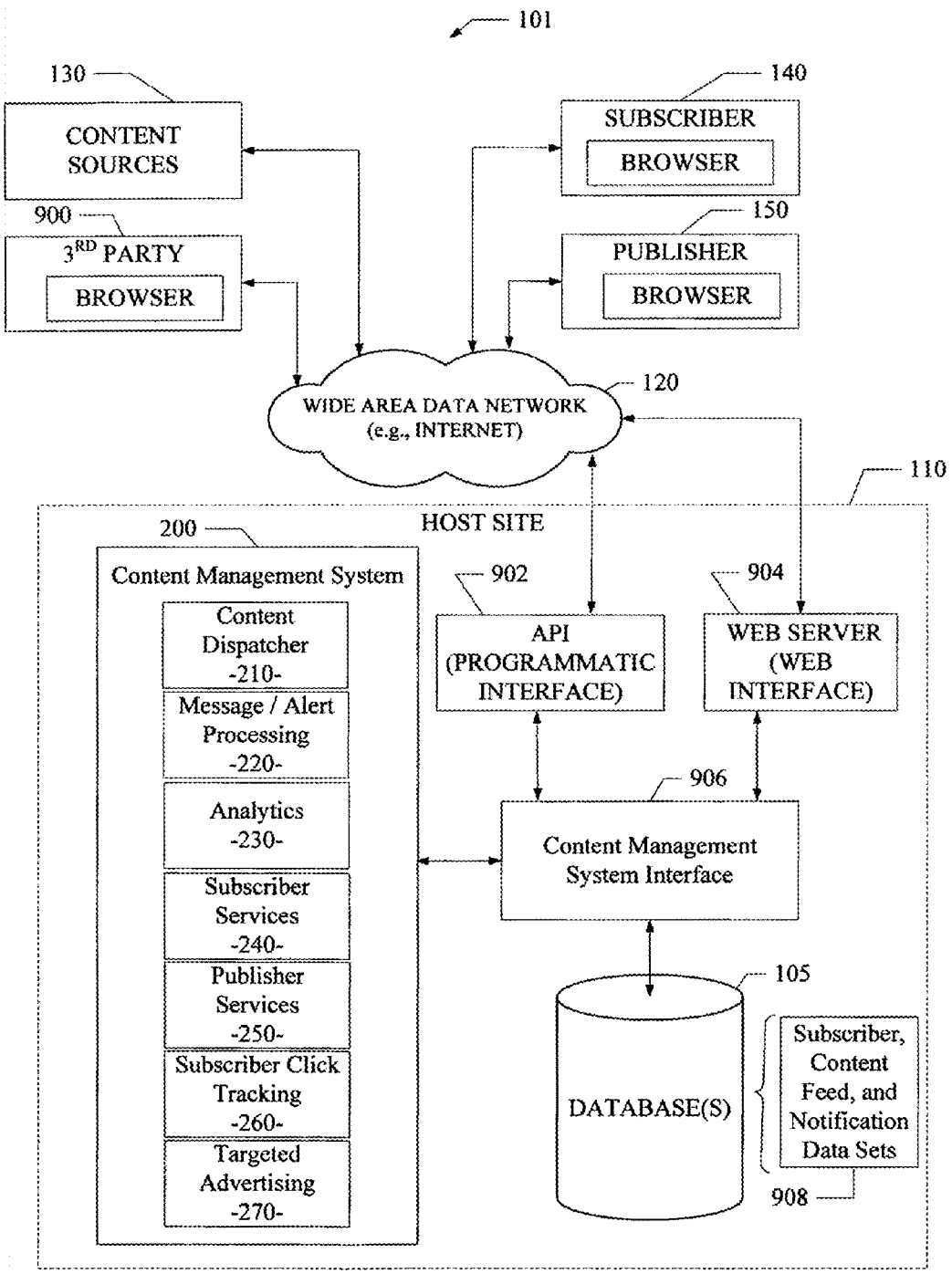
FIG. 17 illustrates another example embodiment of a networked system in which various embodiments may operate.

Referring now to FIG. 17, another example embodiment 101 of a networked system in which various embodiments may operate is illustrated. In the embodiment illustrated, the host site 110 is shown to include the content management system 200. The content management system 200 is shown to include the functional components 210-270. In a particular embodiment, the host site 110 may also include a web server 904, having a web interface with which subscribers may interact with the host site 110 via a user interface or web interface. The host site 110 may also include an application programming interface (API) 902 with which the host site 110 may interact with other network entities on a programmatic or automated data transfer level. The API 902 and web interface 904 may be configured to interact with the content management system 200 either directly or via an interface 906. The content management system 200 may be configured to access a data storage device 105 either directly or via the interface 906.

Figure 18:
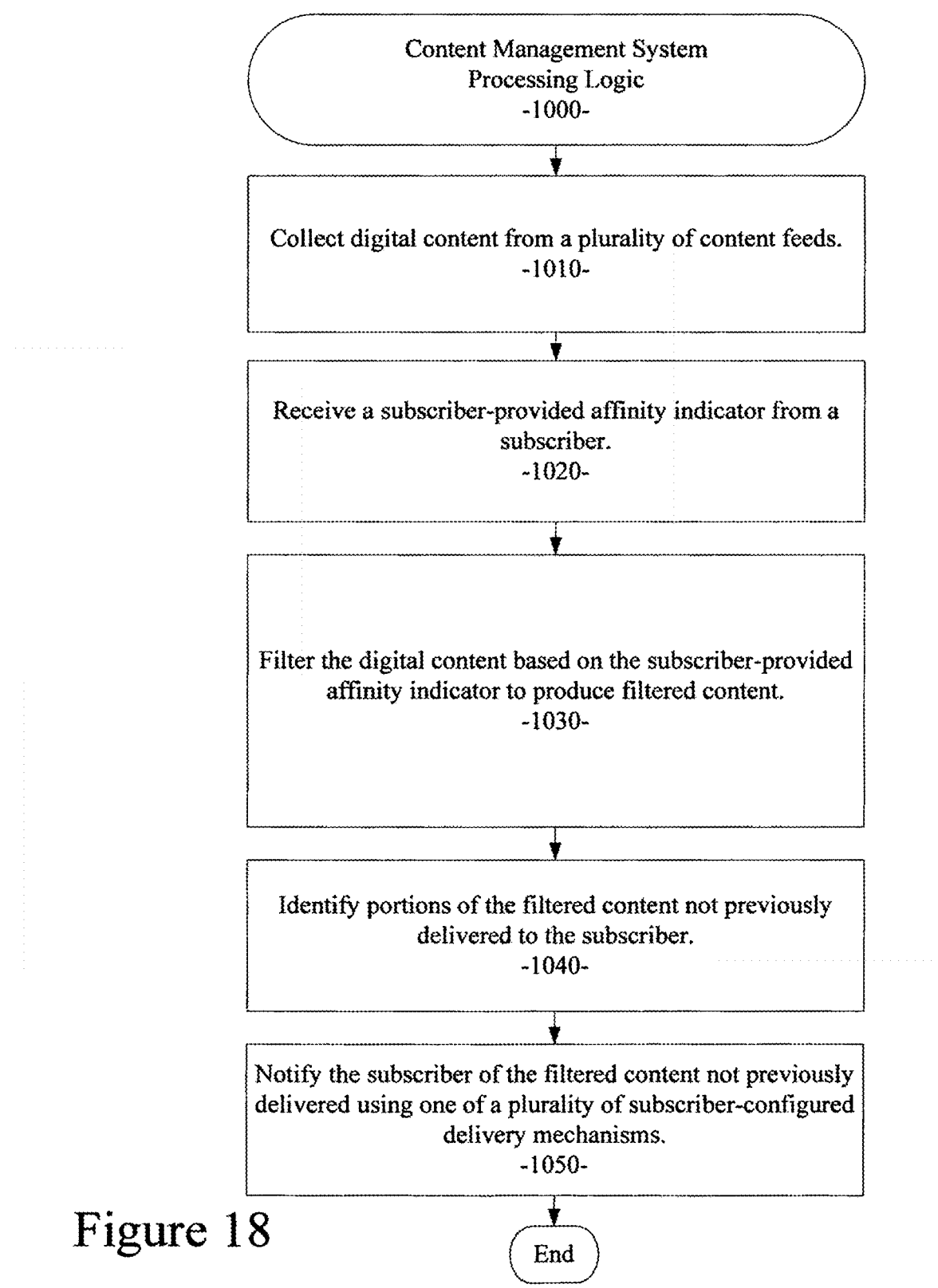
FIG. 18 is a processing flow chart illustrating an example embodiment of a content management system as described herein.

FIG. 18 is a processing flow diagram illustrating an example embodiment of a content management system as described herein. The method of an example embodiment includes: collecting digital content from a plurality of content feeds (processing block 1010); receiving a subscriber-provided affinity indicator from a subscriber (processing block 1020); filtering the digital content based on the subscriber-provided affinity indicator to produce filtered content (processing block 1030); identifying portions of the filtered content not previously delivered to the subscriber (processing block 1040); and notifying the subscriber of the filtered content not previously delivered using one of a plurality of subscriber-configured delivery mechanisms (processing block 1050).

Figure 19:
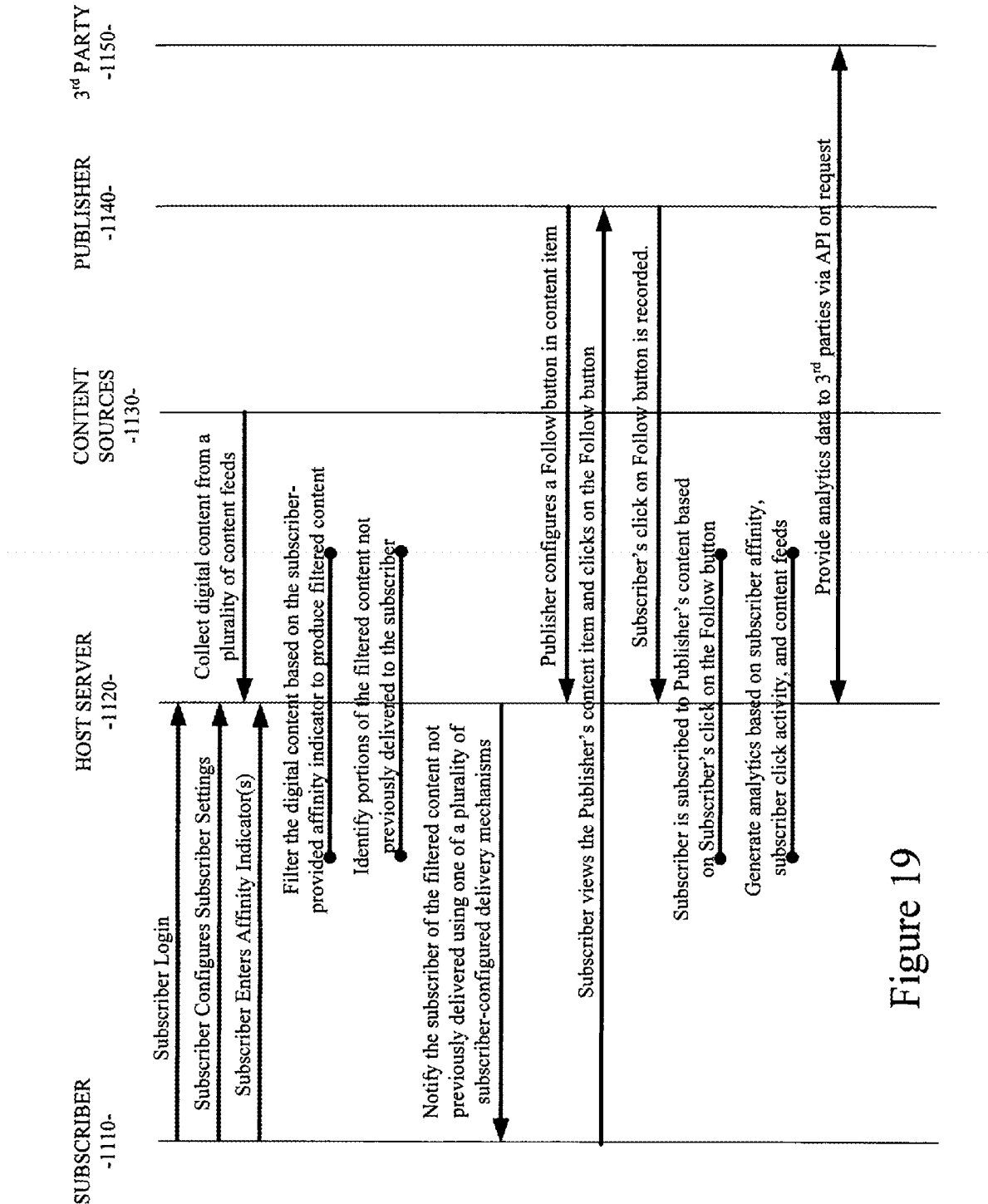
FIG. 19 is an operational flow chart illustrating an example embodiment of content management system as described herein.

FIG. 19 is an operational flow diagram illustrating an example embodiment of a content management system as described herein.

Figure 20:
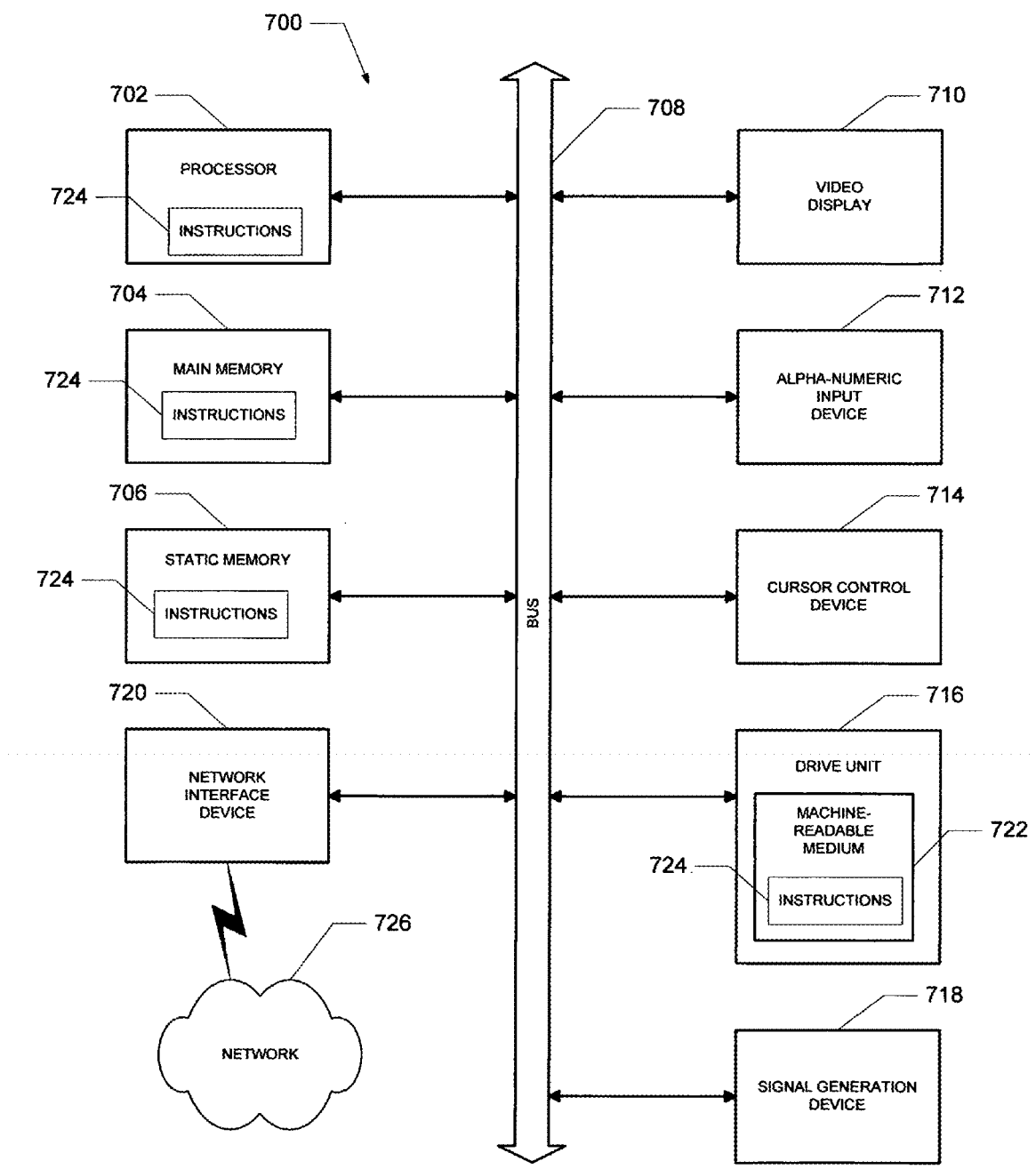
FIG. 20 shows a diagrammatic representation of machine in the example form of a computer system within which a set of instructions when executed may cause the machine to perform any one or more of the methodologies discussed herein.

FIG. 20 shows a diagrammatic representation of machine in the example form of a computer system 700 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" can also be taken to include any medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

We claim:

1. A method, including:

collecting digital content from a plurality of content feeds at a server-resident content dispatcher, the content dispatcher retaining information on each content feed, the information including an identifier or address of a corresponding content source of said each content feed;

receiving a subscriber-provided affinity indicator from a subscriber, the affinity indicator including an indication of a content feed category of interest, the content feed category corresponding to one or more of the plurality of content feeds;

filtering the digital content based on the subscriber-provided affinity indicator to produce filtered content;

tracking interactions with the filtered content by the subscriber;

automatically determining implicit subscriber affinity based on the interactions with the filtered content by the subscriber;

enabling a publisher of at least one of the plurality of content feeds to insert a user-selectable object on a page of a content item from the corresponding at least one of the plurality of content feeds; and presenting the page of the content item with the user-selectable object thereon, on a display, the user-selectable object being configured to allow the subscriber to automatically subscribe to the content item by interacting with the user-selectable object when the page is presented on the display, the user-selectable object being further configured to allow the subscriber to select from among a plurality of notification options, the subscriber being automatically notified by the selected notification option when the content in the content item is updated, the plurality of notification options including email, Short Message Service (SMS) text messaging, and Twitter direct messaging, and enabling a $3^{rd}$ party to access information indicative of the implicit subscriber affinity via either a web interface or an application programming interface (API).

2. The method as claimed in claim 1 wherein tracking interactions with the filtered content by the subscriber includes tracking subscriber interactions with the filtered content based on one from the group: mouse clicks, views, saves, prints, copies made of particular content items, purchases, bids, and subscriber responses to content update alerts for particular content items.

3. The method as claimed in claim 1 including correlating the subscriber-provided affinity indicator and the implicit subscriber affinity to one or more content categories.

4. The method as claimed in claim 3 including correlating the one or more content categories to one or more corresponding advertising types and identifying a particular advertising item from an advertising inventory based on the one or more corresponding advertising types.

5. A system, comprising:

a processor;

a database, in data communication with the processor, for storage of content feed information; and a content management module, executable by the processor, to:

collect digital content from a plurality of content feeds at a server-resident content dispatcher, the content dispatcher retaining information on each content feed, the information including an identifier or address of a corresponding content source of said each content feed;

receive a subscriber-provided affinity indicator from a subscriber, the affinity indicator including an indication of a content feed category of interest, the content feed category corresponding to one or more of the plurality of content feeds;

filter the digital content based on the subscriber-provided affinity indicator to produce filtered content;

track interactions with the filtered content by the subscriber;

automatically determine implicit subscriber affinity based on the interactions with the filtered content by the subscriber;

enable a publisher of at least one of the plurality of content feeds to insert a user-selectable object a page of a content item from the corresponding at least one of the plurality of content feeds; and present the page of the content item with the user-selectable object thereon, on a display, the user-selectable object being configured to allow the subscriber to automatically subscribe to the content item by interacting with the user-selectable object when the page is presented on the display, the user-selectable object being further configured to allow the subscriber to select from among a plurality of notification options, the subscriber being automatically notified by the selected notification option when the content in the content item is updated, the plurality of notification options including email, Short Message Service (SMS) text messaging, and Twitter direct messaging, and configure to enable a $3^{rd}$ party to access information indicative of the implicit subscriber affinity via either a web interface or an application programming interface (API).

6. The system as claimed in claim 5 being further configured to track subscriber interactions with the filtered content based on one from the group: mouse clicks, views, saves, prints, copies made of particular content items, purchases, bids, and subscriber responses to content update alerts for particular content items.

7. The system as claimed in claim 5 being further configured to correlate the subscriber-provided affinity indicator and the implicit subscriber affinity to one or more content categories.

8. The system as claimed in claim 7 being further configured to correlate the one or more content categories to one or more corresponding advertising types and to identify a particular advertising item from an advertising inventory based on the one or more corresponding advertising types.

9. A non-transitory machine-useable storage medium embodying instructions which, when executed by a machine, cause the machine to:

collect digital content from a plurality of content feeds at a server-resident content dispatcher, the content dispatcher retaining information on each content feed, the information including an identifier or address of a corresponding content source of said each content feed;

receive a subscriber-provided affinity indicator from a subscriber, the affinity indicator including an indication of a content feed category of interest, the content feed category corresponding to one or more of the plurality of content feeds;

filter the digital content based on the subscriber-provided affinity indicator to produce filtered content;

track interactions with the filtered content by the subscriber;

automatically determine implicit subscriber affinity based on the interactions with the filtered content by the subscriber;

enable a publisher of at least one of the plurality of content feeds to insert a user-selectable object on a page of a content item from the corresponding at least one of the plurality of content feeds; and present the page of the content item with the user-selectable object thereon, on a display, the user-selectable object being configured to allow the subscriber to automatically subscribe to the content item by interacting with the user-selectable object when the page is presented on the display, the user-selectable object being further configured to allow the subscriber to select from among a plurality of notification options, the subscriber being automatically notified by the selected notification option when the content in the content item is updated, the plurality of notification options including email, Short Message Service (SMS) text messaging, and Twitter direct messaging, and enable a $3^{rd}$ party to access information indicative of the implicit subscriber affinity via either a web interface or an application programming interface (API).

10. The machine-useable storage medium as claimed in claim 9 being further configured to track subscriber interactions with the filtered content based on one from the group: mouse clicks, views, saves, prints, copies made of particular content items, purchases, bids, and subscriber responses to content update alerts for particular content items.

11. The machine-useable storage medium as claimed in claim 9 being further configured to correlate the subscriber-provided affinity indicator and the implicit subscriber affinity to one or more content categories.

12. The machine-useable storage medium as claimed in claim 11 being further configured to correlate the one or more content categories to one or more corresponding advertising types and to identify a particular advertising item from an advertising inventory based on the one or more corresponding advertising types.

* * * * *